United States Patent [19]

Glier et al.

[11] Patent Number: 5,701,398

[45] Date of Patent: Dec. 23, 1997

[54] ADAPTIVE CLASSIFIER HAVING MULTIPLE SUBNETWORKS

[75] Inventors: Michael T. Glier, Chepachet, R.I.; John Cole, Northboro; Mark Laird, Milford, both of Mass.

[73] Assignee: Nestor, Inc., Providence, R.I.

[21] Appl. No.: 684,683

[22] Filed: Jul. 19, 1996

Related U.S. Application Data

[63] Continuation of Ser. No. 269,848, Jul. 1, 1994, abandoned.
[51] Int. Cl.$^6$ .................................................. G06F 15/18
[52] U.S. Cl. ........................... 395/27; 395/24; 395/21
[58] Field of Search ............................... 382/155–159; 395/20–27

[56] References Cited

U.S. PATENT DOCUMENTS 5,276,771  1/1994  Manukian et al. ..................... 395/24

OTHER PUBLICATIONS

*IBM Microelectronics, ZISC®, Zero Instruction Set Computer, Preliminary Information*, Apr. 1994, pp. 31–39.

*Primary Examiner*—Tariq R. Hafiz
*Attorney, Agent, or Firm*—Weingarten, Schurgin, Gagnebin & Hayes LLP

[57] ABSTRACT

A neural network including a plurality of sub-nets stored in a memory array and a method of operation. Each of the sub-nets includes a corresponding plurality of weights and is individually operable to classify an input vector. A computation unit, including a distance calculation unit and a math unit, is responsive to an input vector comprising input training features for determining a distance between the weights of each sub-net to each of the input features of the input vector and for determining whether the distance is within a particular region of influence. Also described is a parallel process for training the sub-nets.

13 Claims, 15 Drawing Sheets

| | 0 | 256 | 512 | 768 | |
|---|---|---|---|---|---|
| | 128 | 384 | 640 | 896 | |
| 0 | 0 | 10 | 18 | 20 | 28 | 30 | 38 |
| 32 | 1 | 9 | 11 | 19 | 21 | 29 | 31 | 39 |
| 64 | 2 | A | 12 | 1A | 22 | 2A | 32 | 3A |
| 96 | 3 | B | 13 | 1B | 23 | 2B | 33 | 3B |
| 128 | 4 | C | 14 | 1C | 24 | 2C | 34 | 3C |
| 160 | 5 | D | 15 | 1D | 25 | 2D | 35 | 3D |
| 192 | 6 | E | 16 | 1E | 26 | 2E | 36 | 3E |
| 224 | 7 | F | 17 | 1F | 27 | 2F | 37 | 3F |

FIG. 9A

|   |   | 0 | 8 | 10 | 18 | 20 | 28 | 30 | 38 |
|---|---|---|---|----|----|----|----|----|----|
| 8 | X | X | 0 | 8 | 10 | 18 | 20 | 28 | 30 | 38 |
| 9 | X | X | 1 | 9 | 11 | 19 | 21 | 29 | 31 | 39 |
| 10| X | X | 2 | A | 12 | 1A | 22 | 2A | 32 | 3A |
| 11| X | X | 3 | B | 13 | 1B | 23 | 2B | 33 | 3B |
| 12| X | X | 4 | C | 14 | 1C | 24 | 2C | 34 | 3C |
| 13| X | X | 5 | D | 15 | 1D | 25 | 2D | 35 | 3D |
| 14| X | X | 6 | E | 16 | 1E | 26 | 2E | 36 | 3E |
| 15| X | X | 7 | F | 17 | 1F | 27 | 2F | 37 | 3F |

ADAPTIVE CLASSIFIER HAVING MULTIPLE SUBNETWORKS

This application is a continuation of application Ser. No. 08/269,848, filed Jul. 1, 1994, now abandoned.

FIELD OF THE INVENTION

This invention relates to adaptive classification systems and more particularly to neural networks.

BACKGROUND OF THE INVENTION

As is known in the art, there exists a class of circuits and systems which emulate higher order brain functions such as memory, learning and or pattern perception/recognition. Such systems are generally referred to as neural networks or adaptive classifiers. Neural networks may be trained to model regions in which particular features or characteristics of an input signal are distributed. By having an accurate model of such regions, a neural network may thus recognize if unknown data fed thereto belongs to a particular class represented by the modelled region.

Such modeling is accomplished by presenting to the neural network a number of training signals belonging to known classes of interest. Each of the training signals is provided having a predetermined number of preselected characteristics or features. During a training mode, each of the features and the class to which a signal having such features belongs are provided to the neural network. The neural network stores the information and thus generates a model of the region which includes signals of a particular class.

Typically however, the neural network includes a plurality of modeled regions which represent a corresponding plurality of different classes. In many practical problems such modeled regions have overlapping portions. When an unknown input signal has characteristics which map into a region where no overlap exists among the portions the neural network is able to classify the unknown input signal into one of the classes.

However, when the unknown signal has characteristics which map the signal into a region where portions of the different classes overlap, the neural network is unable to classify the unknown input signal with certainty, because the region belongs to more than one class. Thus, the network provides acceptable results only when class regions are separable, that is, when no overlap exists between the class regions.

One approach to solving this problem caused by overlapping class regions is by using a so-called Probabilistic Neural Network (PNN). The PNN approach computes probability estimates by requiring each pattern in the training set to be stored in a first layer of weights.

One problem with the PNN approach however, is that in some applications a large number of training patterns must be used. In many practical neural network applications, the number of training patterns is an exponential function of the number of input features. Thus, practical problems generally require a prohibitively large number of training patterns which make implementation of a probabilistic neural network impractical.

Due to the large number of training patterns required, a relatively large amount of memory is required. In some applications the amount of available memory may be limited. Furthermore, memory size is especially important when it is desirable to manufacture the neural network as an integrated circuit.

Moreover, in some applications such as large-scale pattern classification tasks, it may be desirable to provide a neural network which may operate on a real-time basis. To achieve real time operation in such applications however, the neural network must be capable of processing information in a relatively rapid manner. Thus, to meet such processing speed requirements it may be desirable to provide a neural network as a semiconductor integrated circuit.

However, due to the complexity of the resultant circuits associated with the use of predecessor neural network architecture, it has been relatively difficult to construct a neural network integrated circuit which was useful for typical classification problems. Neural networks able to operate in a wide variety of processing applications generally have neural network architectures requiring a relatively large number of processing element inter-connectivity. This results in a reduction of the number of processing elements which may be practically implemented in an integrated circuit using present manufacturing techniques.

It would thus be desirable to provide an adaptive classification system as an integrated circuit device which is capable of resolving ambiguities which occur when class distributions overlap and prototypes from more than one class are likely to fire at the same time in response to a single unknown input pattern.

SUMMARY OF THE INVENTION

In accordance with the present invention, a neural network and methods of operation within such a network are disclosed. The neural network is provided having an input layer, a middle layer and an output layer. A method of operating the network includes the steps of presenting an input vector having a plurality of training features to the neural network, concurrently computing distances between a plurality of said training features and a plurality of prototype weight values and in response to an indication of a last training epoch, storing a count value corresponding to the number of occurrences of an input vector within a prototype. With this particular arrangement a probabilistic neural network is provided. The network may perform a plurality of pipeline operations to permit real time classification in response to applied input vectors.

The neural network may include a prototype memory having a plurality of weight values stored therein. A distance calculation unit is coupled to the prototype memory and to a math unit. The distance calculation unit may perform a plurality of concurrent calculations to compute a distance between an input vector and each of the plurality of weight values stored in the prototype memory.

The method and apparatus in accordance with the present invention may be fabricated as an integrated circuit device to permit classifications to be performed at high speed and thus permit utilization of the device for numerous classifications which were heretofore difficult to perform using conventional neural networks.

Furthermore, other learning algorithms may be seamlessly accommodated via a programmable resident microcontroller. For example, a probabilistic neural network (PNN) may be incorporated into the network via an RCE procedure by setting the initial value of the middle-layer cell thresholds to zero. This will cause the addition of a new middle-layer cell with the presentation of each new training pattern. Thus the middle-layer cells act as storage elements for the full training set. A second layer of cells compute a distribution (activation) function such as a Gaussian or an exponential decay. Similarly, the output layer cells compute a linear sum of the middle layer activations. Since the full training set has been stored within the middle layer, the output cells compute weighted sums where the sum occurs over all patterns in the training set.

BRIEF DESCRIPTION OF THE DRAWINGS

The foregoing features of this invention as well as the invention itself may be more fully understood from the following detailed description of the drawings in which

FIG. 9A is a block diagram of a prototype memory array;

FIG. 11 is a block diagram of a sector used table;

DESCRIPTION OF THE PREFERRED EMBODIMENT

Figure 1:
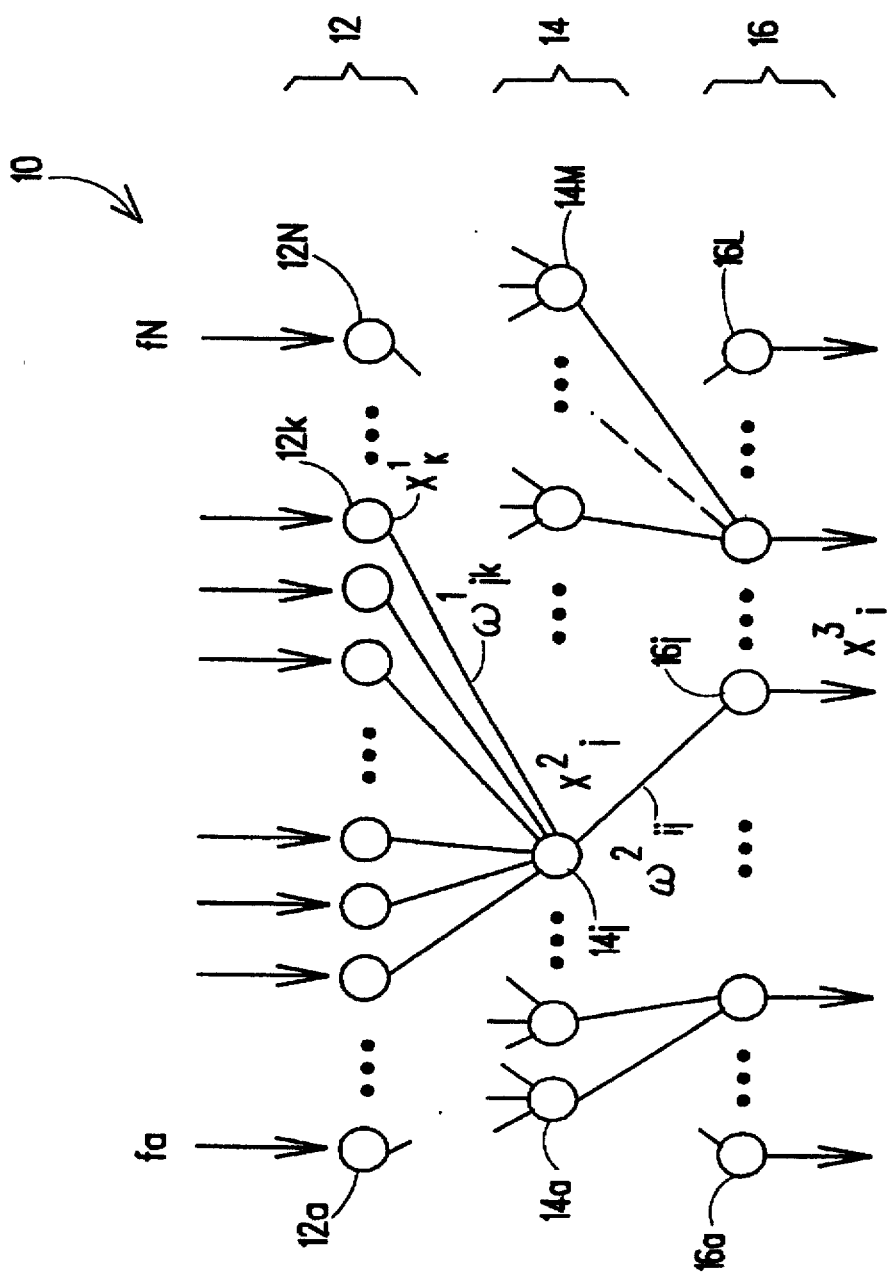
FIG. 1 is a block diagram of a Probabilistic Restricted Coulomb Energy neural network.

Referring now to FIG. 1, a feedforward, three layer neural network 10 includes an input layer 12 having a first plurality of cells 12a–12N. Each of the input layer cells 12a–12N receives one of a plurality of input features $f_a$–$f_N$ provided thereto. A prototype layer 14 includes a second plurality of cells 14a–14M. Each of the cells 14a–14M are coupled to at least one of the input layer cells 12a–12N. A classification layer 16 has a third plurality of cells 16a–16L with particular ones of the cells 16a–16L coupled to at least one of the prototype layer cells 14a–14M.

The input layer cells 12a–12N are coupled to particular ones of the prototype layer cells 14a–14M and particular ones of the prototype layer cells 14a–14M are coupled to particular ones of the output layer cells 16a–16L during a learning or training process. Briefly, the neural network learns by having example network patterns and known classifications provided thereto. The training process will be described further below in conjunction with FIG. 6. Suffice it here to say that the layers 12–16 are coupled via the cells 12a–12N, 14a–14M, and 16a–16L such that when the network 10 operates in a classification mode and the input layer 12 receives a plurality of features from an unknown input signal, the classification layer 16 provides an output signal indicative of a class to which the input signal belongs.

The middle layer cells 14a–14M may be provided as radius limited perceptrons and the output layer cells 16a–16L may correspond to inner product cells. A feedforward, three-layer neural network which combines radius-limited perceptrons with inner-product perceptrons may generally be referred to as a radial basis function (RBF) neural network.

In the RBF network 10, the input layer cells 12a–12N transmit an input pattern vector to each of the cells in the second layer. Denoting an exemplary one of the second layer cells 14a–14M as $X^2_j$ where the superscript 2 identifies the layer index and the subscript j identifies the cell number, the second layer cells 14a–14M may be provided as radius-limited perceptrons which compute activations according to:

$$X^2_j = \exp(-\sigma d^2_j) \qquad \text{Equation (1)}$$

in which:

σ corresponds to a smoothing constant selected to minimize the error classification of a know testing example; and $d^2_j$ corresponds to a distance which may be computed according to Equation 2:

$$d_j^2 = \sum_i^N |f_i - \omega_{ij}^1| \qquad \text{Equation (2)}$$

in which:

N corresponds to the number of input features;

$\omega^k$ refers to the weight matrix connecting the $k^{th}$ layer to the $(K+1)^{th}$ layer.

Thus in the neural network 10, the activation function of each of the second layer cells 14a–14M is provided as an exponential function as shown in Equation 1.

The activation function of the third layer cells corresponds to an identity function such that:

$$X_i^3 = \sum_{j=1}^N \omega_{ij}^2 X_j^2 \qquad \text{Equation (3)}$$

in which:

the sum is over the cells connected to $X^3_i$ during training. That is, the summation is over only those cells which the output layer cell $X^3_i$ is wired to as a result of training.

The output layer 16 thus computes a weighted sum of outputs. Thus in a probabilistic RCE computation, $$d_j = \sum_{i=1}^N |u_i - P_{ij}| \qquad \text{Equation (4)}$$

in which:

N corresponds to the number of possible input features;

j takes on values from 1 to M;

$u_i$=an input vector element; and $P_{ij}$=a stored prototype vector element.

A probability density function (pdf) comprises a plurality of elements which may be expressed as:

$$pdf_j = C_j e^{-kd_j} \qquad \text{Equation (5)}$$

in which:

$C_j$ corresponds to a scalar value representative of the frequency of occurrence of a training vector from a particular class in a particular prototype. The $C_j$ values are stored in the weights $\omega^2_{ij}$. Such storage of scalar representative values of frequency of occurrence in the weight values avoids the need to store a prototype for each training feature vector. Furthermore, storage of the weight values is economical in terms of storage space required to provide a probabilistic computation.

The pdf for a particular class is thus provided as:

$$pdf_c = \Sigma pdf_k$$

in which:

c is one of L classes.

k corresponds to the kth prototype belong to class C.

Thus in a neural network able to accept, for example, a maximum of 256 input features and identify a maximum of 64 classes and generate a maximum of 1024 prototypes then maximum values for L, M and N correspond to N=256, M=1024 and L=64.

Non separable class regions may be characterized by probability density functions which specify the dependance of the distribution for a class C on a random input pattern f. By computing scalar values corresponding to probability density functions (pdfs) the neural network 10 may provide an output signal even in those applications which include class regions which share points in a feature space (i.e. non separable regions). Thus, when portions of the class regions are not separable, the neural network 10 may estimate the probability that the random input pattern belongs to a particular class.

To provide such an estimation, Bayes rule for classification may be applied to patterns which occur in the non-separable regions if the probability density functions are known. Thus, an unknown input signal which falls within an overlapping class region belongs to class A if:

$$p(x|A)P_A > p(x|B)P_B \quad \text{Equation (6)}$$

in which:

$p(x|A)$ corresponds to the probability density function of A;

$P_A$ corresponds to the a priori features for Class A;

$p(x|B)$ corresponds to the probability density function of B; and $P_B$ corresponds to the a priori features for Class B.

Figure 2:
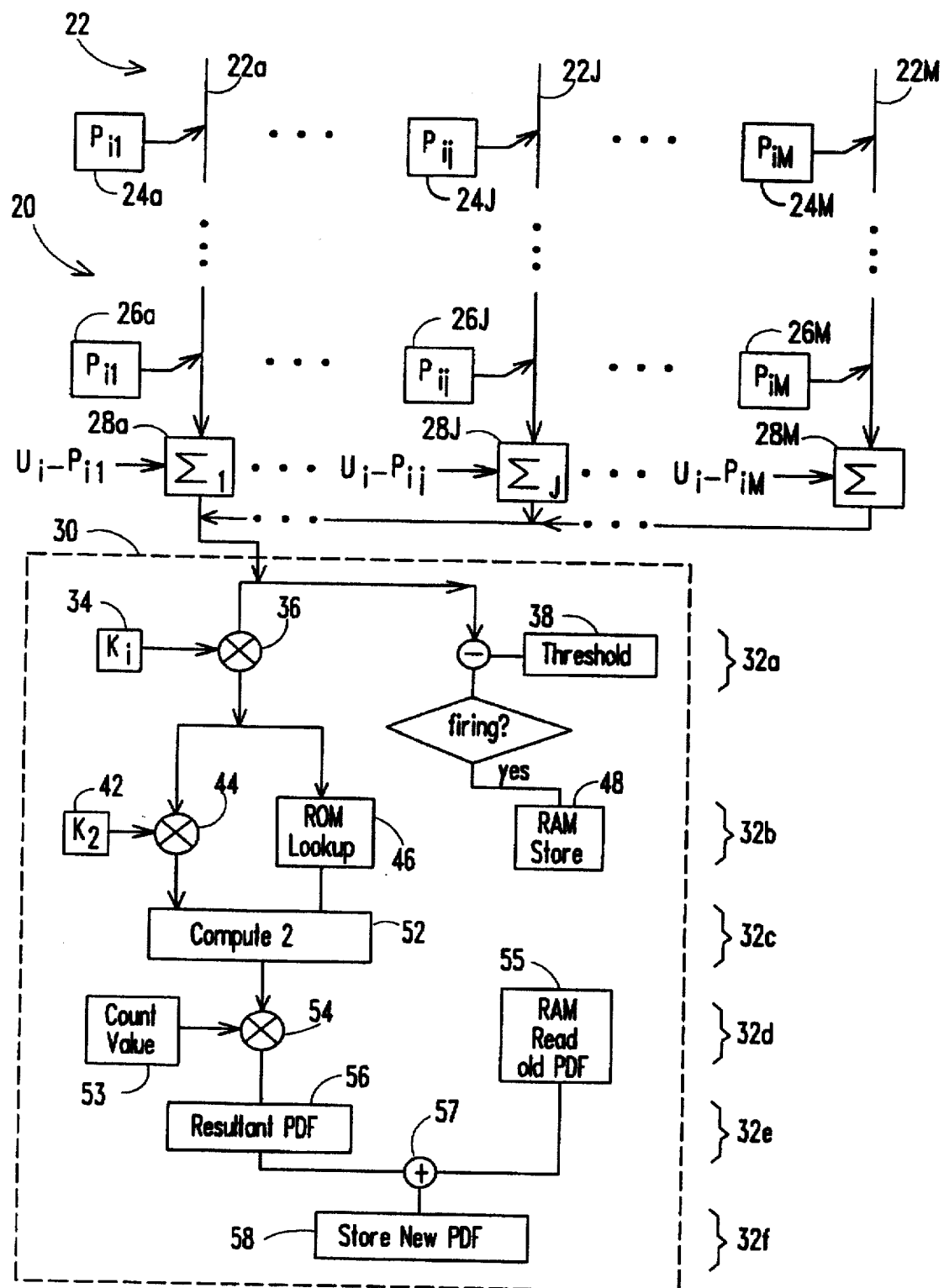
FIG. 2 is a schematic diagram of a probabilistic Restricted Coulomb Energy architecture.

Referring now to FIG. 2, a Probabilistic Restricted Coulomb Energy (PRCE) neural network 20 includes a plurality of prototypes 22a–22M each of which associates with a corresponding one of a plurality of summing circuits 28a–28M, generally denoted 28. Each of the prototypes 22a–22M has associated therewith a plurality of weights having weight values $P_{ij}$. For example prototype $22_j$ has associated therewith, a plurality of weights $P_{ij}$ denoted as $24_j$–$26_j$. A plurality of features $U_i$ (i=1–N), representative of an input signal U, are each simultaneously fed to the M summing circuits 28 to be compared in turn to N weights $P_{ij}$ for each prototype.

Each of the summing circuits 28 computes the sums of differences between each of the features $U_i$ and the weights 24–26. It should be noted that each of the plurality of input features $U_i$ are sequentially fed simultaneously to each of the plurality of summing circuits $28_j$ to be compared with weights $P_{ij}$.

The summing circuits 28a–28M are coupled to a math unit 30. The math unit 30 operates as a six stage pipeline in which one exponential operation, three multiplication operations, one summation operation and one comparison operation are performed. The math unit 30 thus includes a plurality of sublayers or stages 32a–32f. In each of the stages 32a–32f, one or a plurality of steps may take place simultaneously.

These steps implement the equations described above in conjunction with FIG. 1.

As mentioned above such computations are preferably performed in a pipeline operation. For example, each of the summing circuits 28a–28M sequentially feeds an input signal to the first layer 32a. In the first layer 32a a multiplication and a distance comparison are computed in parallel.

In layer 32b, a multiplication, a ROM lookup and a firing check may next be simultaneously performed.

In layer 32c, an exponential computation corresponding to that described in Equation (1) of FIG. 1 may be expressed as $2^{-x}$ is performed.

In layer 32d, a count value is multiplied by the result of the exponentiation and the old PDF value is retrieved.

In layer 32e a resultant PDF value and the old PDF value are combined so that a new PDF value may be stored in a memory location as shown in layer 32f.

Thus, the neural network 20 receives a plurality of input pattern features $U_1$–$U_N$ and provides output classification information $PDF_1$–$PDF_L$. Based on the distances calculated between the input pattern features $U_1$–$U_N$ and each of the plurality of stored prototype weights $P_{ij}$, the neural network 20 provides output signals $PDF_1$–$PDF_L$ indicating the classes of prototype vectors that are in the proximity of the input vector U. The output signals $PDF_1$–$PDF_L$ may be used to compute a probability value indicating the probability that the input vector U belongs to a particular one of a plurality of possible classes. Thus, if an input vector falls in proximity to prototypes from more than one class, the neural network 20 may calculate the relative probability that the pattern is in a particular one of a plurality L of possible classes.

The maximum number of input pattern features may correspond, for example, to 256 and the maximum number of classes may correspond to 64 for example. One of ordinary skill in the art, however, will recognize that the techniques described herein are applicable to various sizes of input pattern features and classes.

Figure 3:
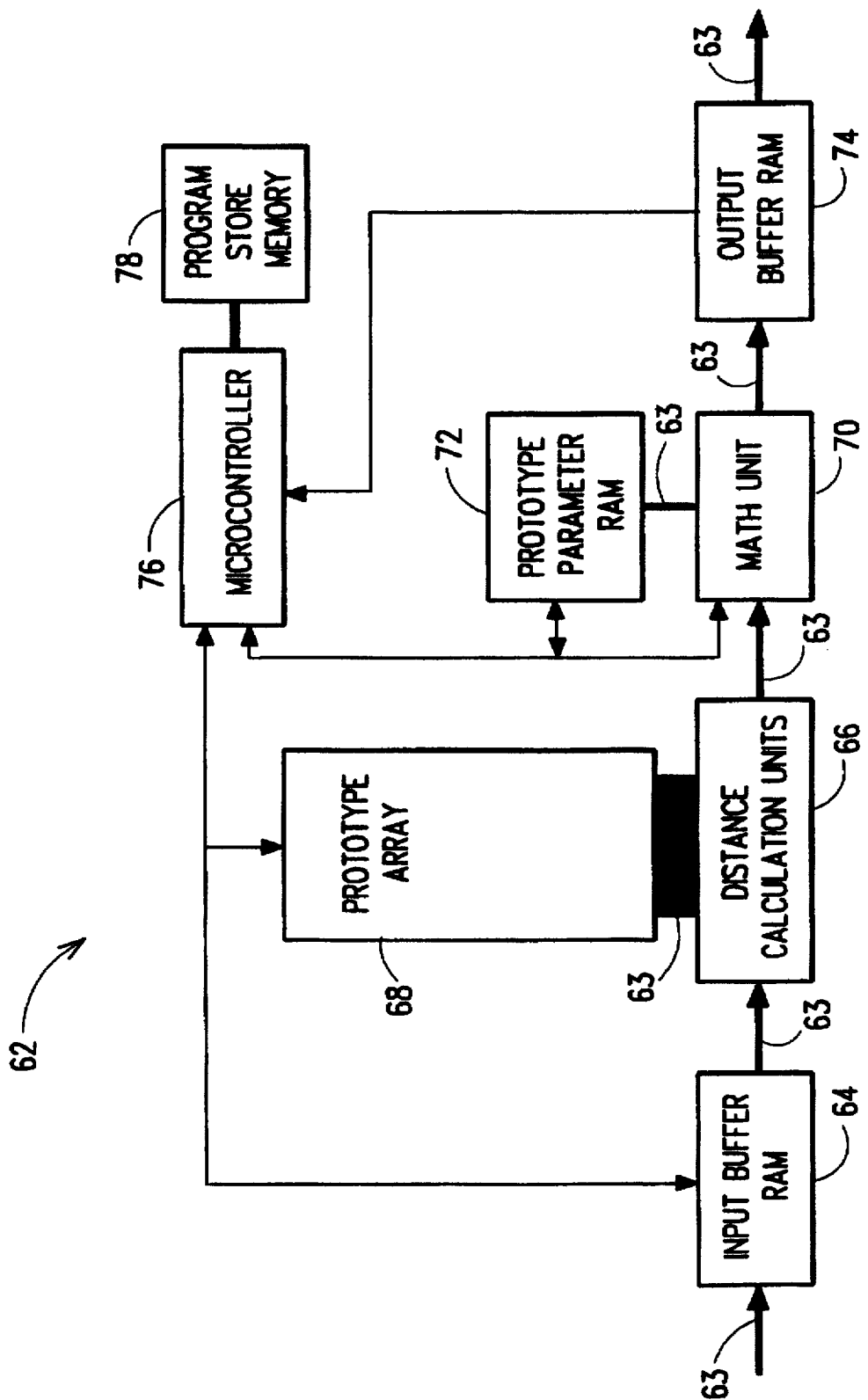
FIG. 3 is a block diagram of a neural network classification pipeline.

Referring now to FIG. 3, a neural network 62 operating according to a pipeline classification scheme includes an input buffer RAM 64 coupled to a distance calculation unit (DCU) 66. The distance calculation unit 66 is coupled to a nonvolatile prototype memory array 68 having a plurality of prototype weights stored therein. Such prototype weights are stored in the prototype array 68 during a learning mode as will be described further in conjunction with FIGS. 6 and 7 below. The DCU 66 is also coupled to a math unit (MU) 70. The math unit 70 is coupled to a prototype parameter RAM (PPRAM) 72 and an output buffer RAM 74. The prototype array 68 and PPRAM 72 have coupled thereto a microcontroller 76 and a program store memory 78 is coupled to the microcontroller.

The elements 64 through 78 which are interconnected to provide the network 62 will be described in further detail in conjunction with FIG. 4 below. The neural network 62 operates in a pipeline mode to rapidly perform classification tasks; that is, pipelined operations occur such that the neural network 62 is able to rapidly analyze and classify unknown data fed thereto.

Pipelining generally refers to a technique in which the output of one process serves as an input to a second process, the output of the second process serves as an input to a third process and so on. Such processes take place simultaneously within a single cycle time. In the neural network 62, pipelined operations occur on at least two levels. At a first level, pipelining occurs in the flow of data between the input buffer RAM 64 and the output buffer RAM 74 along pipeline path 63. On a second level, and as will be described further below, pipelined operations occur in the input and output buffer RAMs 64, 74 distance calculation unit 66 and the math unit 70.

The microcontroller 76 is coupled as shown to direct process steps during some non-classification and non-learning operating modes of the network 62. The microcontroller 76 does not control the flow of data through the pipeline, rather the pipeline operates autonomously. When the network 62 is in a learning or a classification mode, the microcontroller 76 is effectively detached from the elements in the pipeline path 63 in the learning and classification modes. The microcontroller 76 merely determines correct answers in the learning mode.

Thus the first level of pipelining includes, a first pipeline stage corresponding to a distance calculation stage of the pipeline during which time the distance calculation unit 66 computes distances. Simultaneously, in a second pipeline stage corresponding to a class probabilities pipeline stage, the math unit 70 computes class probabilities. Also simultaneously in a third pipeline stage corresponding to an input/output stage of the pipeline, the input buffer RAM 64 may receive input data fed thereto or the output buffer RAM 74 may transfer data out of the network 62 while the computations in the DCU 66 and MU 70 are taking place. Such input output transfers may take place simultaneously.

One pipeline step time may correspond, for example, to a predetermined number of clock cycles. For example, if one pipeline step time corresponds to 1024 clock cycles then in the neural network 62, a new classification may be available every 1024 clock cycles. The pipeline step with the longest required time determines how often a new classification may be available.

It should be noted that the time required to perform the input and output steps for one classification is relatively short when compared to the pipeline step time. That is, the time required to perform the input/output steps is a relatively low percentage of the time corresponding to the worst case pipeline step. Thus, the I/O processes performed in the input and output buffer RAMS 64, 74 respectively should not limit the throughput of the network 64.

Thus as will be described in conjunction with FIG. 5, when an array of parallel coupled neural networks are coupled to a system administrator, the system administrator is provided having adequate time in which to manage the array of parallel coupled neural networks 62 without causing any of the neural networks 62 to suspend their calculations due to waiting for I/O service.

The second level of pipelining occurs within the input buffer RAM 64, the DCU 66, the math unit 70 and the output buffer RAM 74. The input buffer RAM 63 may be provided having a pair of input buffers and thus is able to receive data while simultaneously providing data to the DCU 66. The DCU 66 performs parallel computations of distances between an input vector and each of the plurality of prototype weights stored in the prototype array 68.

The math unit 70 compares the distances computed by the DCU with the region of influence values of each of the prototype weights stored in the prototype array to determine if a prototype is firing. The math unit performs one pdf calculation/distance comparison per clock cycle. The MU 70 performs two multiplications, an exponential, a compare operation and an accumulate operation in the six stage pipeline. The output buffer RAM may be provided having a pair of output RAM units and thus is able to receive data from the math unit 70 while simultaneously providing output values from the pipeline.

Figure 4:
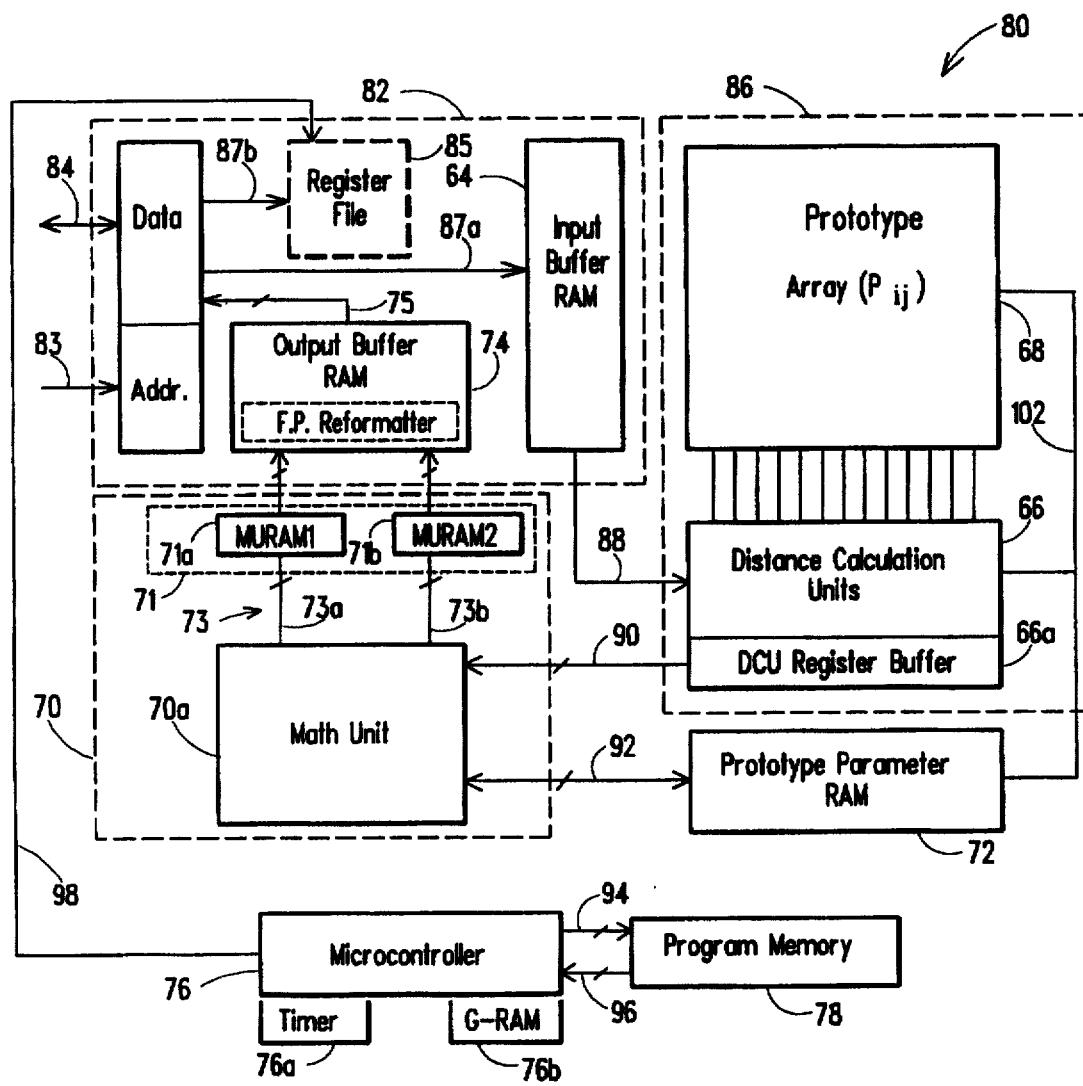
FIG. 4 is a block diagram of a neural network architecture.

Referring now to FIG. 4, in which like elements of the neural network 62 (FIG. 3) are provided having like reference designations, a neural network 80 includes an I/O unit 82 having a 64 bit configurable input/output data bus 84. The bus 84 may operate in a 32 bit or a 64 bit data transfer mode.

The I/O unit 82 further includes the input buffer RAM 64 and the output buffer RAM 74. Data is fed to the network 80 through the data bus 84 to the input buffer RAM 64. As mentioned in conjunction with FIG. 3 above, the input buffer RAM 64 may include a plurality of identical RAM blocks to allow pipelined operations to occur. The input buffer RAM 64 may be provided, for example, having a pair of RAM blocks to thus provide the input buffer as a 256×5×2 input buffer RAM 64.

In a learning mode, pattern data and class data are fed to the network 80 through the data bus 84. The pattern data is transmitted along a data path 87a to an addressed memory location in the input buffer RAM 64. The pattern data is thus fed directly to the input buffer RAM 64 through the data path 87a and is subsequently fed to the DCU 66.

The class data, on the other hand, is transmitted using an address of a register in a register file 85. The class data is thus provided to the register file 85 through a separate data path 87b.

The class data is not fed to the prototype array 68. Rather, the microcontroller 76 accesses the register file 85 to determine what class the data belongs to such that a class association may be set in the output unit 74. Thus the microcontroller 76 directs the learning process.

When the network 80 operates in a classify mode, the input data is fed directly from the bus 84 to the input buffer RAM 64 through the data path 87a.

The input buffer 64 receives data fed thereto and provides the data to the distance calculation unit 66 and the prototype array 68 (PADCU unit 86) through a five bit prototype input bus 88.

During the learning mode of the neural network 80, a plurality of learned cell weight values $P_{ij}$ and corresponding field of influence values $\lambda_j$ are generated. The cell weight values $P_{ij}$ are stored in the prototype array 68 and the region of influence values $\lambda_j$ are stored in the PPRAM 72. The cell weights are stored in the nonvolatile memory 68 to thus avoid any need to download previously stored values from an external source upon power up of the network 80.

In the present embodiment the prototype array 68 has 256×1024 memory locations and each of the weights stored therein are represented by a 5 bit digital word. Those of ordinary skill in the art will recognize that the prototype array may be provided having any appropriately selected dimensions. Furthermore, fewer or more than 5 bits may be used, however, it has been found that 5 bits provides adequate resolution of typical pattern features and allows a relatively simple circuit design to be used. Thus, in this instance 1024 prototype vectors may be stored in the prototype array 68.

The DCU 66 calculates the city-block distance from a prototypical example stored in the prototype memory array 68 to a current input vector fed to the network 80. In the second level of pipelining the DCU 66 perform such calculations in parallel. That is, the DCU 66 includes a plurality of computation units which operate simultaneously. Thus, if the DCU 66 is provided having 512 of such computation units for example, then up to 512 distances may be concurrently computed in the DCU 66.

Since each of 1024 prototype vectors has 256 components, a total of 256×1024 subtract-accumulate operations should be executed to calculate the 1024 city-block distances. The DCU 66 executes a plurality of pipeline stages to provide one subtract-accumulate per clock cycle when the clock cycle is provided having two phases. The DCU 66 includes a DCU register buffer 66a which may be provided for example as a pair of buffer registers. The DCU register 66a provides input data to the math unit 70 via a bus 90 having a thirteen bit bus width.

In an alternative embodiment, rather than storing the learned data in the prototype array 68, cell information may be rapidly downloaded to the prototype array 68 from an external source without changing on board stored constants. Thus the network 80 may process memories involving many more than 1024 second layer cells by serial downloading of all information.

A prototype parameter flash random access memory (PPRAM) 72 may be provided as a volatile memory block in which the prototype parameters for each prototype in the prototype array are stored. The PPRAM 72 may be organized as a 48 bit memory block provided as 3 16 bit sub-blocks. In the first 16 bit sub-block is stored the smoothing factor σ, the class type, an indicator of whether the region of influence of the prototype corresponds to the minimum allowable distance ($\lambda_{min}$) and an indicator of whether the prototype is used or available. In the second 16 bit sub-block is stored the threshold values ($\lambda$) and an indicator of whether the prototype is defective. In the third 16 bit sub-block is stored the count values.

Prior to shutdown of network 80, the prototype parameters may be transferred from the volatile memory 72 to the nonvolatile prototype memory 68. The nonvolatile memory 68 may therefore be used to store parameters associated with each prototype before powerdown.

The nonvolatile memory 68 insures that learning information generated by the neural network 80 during the learning mode may be restored on powerup without downloading such information from an external source. The results of the learning process are thus self contained in the neural network 80.

The memory 68 may be provided, for example, having 64K 16-bit words. Only 48K words are required to store the parameters normally associated with the prototypes. Thus, 16K words of unused storage locations exist in the memory 68 and may be available for storage of other parameters which may be accumulated during the neural network learning mode.

The values stored in the PPRAM 72 are stored as 16 bit value. The prototype array 68 however is provided having 5 bit cells. Thus, to transfer the data from the PPRAM 72 to the prototype array 68 each 16 bits of data in the PPRAM 72 may be stored in 20 bits of defective or unused cells in the prototype array 68.

That is, a 16 bit word from the prototype parameter RAM 72 is stored in a packed form in the prototype array 68 in such a way as to permit recovery of the data upon power-up. That is, upon power-up of the network 80, the PPRAM data stored in the prototype array 68 may be recovered from the prototype array 68 and returned to the PPRAM 72.

In particular, each sixteen bit word from the prototype parameter RAM 78 is stored in four five bit cells of the prototype array 68. The four five bit cells thus provide 20 bits in the prototype array 68 in which data from the PPRAM 72 may be stored.

The four five bit cells may be linked together by setting some of the bits in each of the prototype elements to provide a link list. To provide the link list, four bits of each five bit cell is used to store the data. The fifth bit in each cell points to an address location of the next cell in the linked list having the next 4 bits of PPRAM data. Thus, each cell in the link list points to another cell in which related data from the PPRAM 72 is stored.

The math unit 70 includes a computation portion 70a and a math unit RAM 71 having class probabilities and a list of firing classes stored therein. The computation portion of the math unit 70a accumulates the results of its calculations in the math unit RAM 71. The math unit RAM (MURAM) 71 is thus used to buffer classification results as they are produced by the computation portion 70a of the math unit 70.

The math unit RAM 71 may be provided for example as a pair of identical RAM blocks 71a, 71b. The math unit computation portion 70a stores results in a first MURAM 71a while the output unit 74 receives output data from a second MURAM 71b. Thus pipeline operations may be performed in the math unit 70.

As mentioned above in conjunction with FIG. 3, the MU 70 executes two multiplies, an exponential, a compare and an accumulate in a 5 stage pipeline. In the event the neural network 80 is provided as an integrated circuit, reduced precision integer and floating point representations may be used in the computations to minimize the area required for this circuitry.

Coupled to the microcontroller 76 is the program memory 78 which may be provided as a non-volatile Flash memory having 4K 16-bit words. The program memory 78 may be over written approximately 10K times without wearing out the non-volatile memory elements. An instruction may typically require one or more words of program memory. Here, twelve bits are used to address the program memory 78.

The neural network 80 may be provided as an integrated circuit implementation of the three-layer network described above in conjunction with FIGS. 1 and 2. Trade-offs between input-layer, middle-layer and output-layer dimensions, resolutions of the various calculations, and speed of network throughput may of course be made to provide a neural network integrated circuit having optimized performance characteristics for a particular application.

It has been found that a high dimensional input layer is preferable. For example, it has been found that an input dimension of 256 in an image processing application may permit a single pass classification of 8 edge-feature groups in approximately 30 image sub-windows extracted from a pixel image. It is thus believed that feature resolution of no more than 5 bits in the present invention is sufficient for accurate classification of patterns from several application domains, including but not limited to handprint classification, sea-trial active sonar signals, and speech signals among other typical classification tasks.

As a result of these selections, the input pattern distributions fall within a feature space of 8192 binary dimensions. To encode these distributions, the first-layer weights $X^1_{ij}$ are resolved to accuracy. The 1024 middle-layer cells are used to compute distances using the city-block similarity metric described above. The distances may be computed for example by sequentially performing a pair of 512 simultaneous calculations in the DCU 66.

The neural network 80 may operate in one of a plurality of classification modes. For example, the network 80 may operate in the RCE learning and classification mode. The RCE mode of operation is described in U.S. Pat. No. 4,326,259 assigned to the assignee of the present invention and incorporated herein by reference. The neural network 80 may also operate in the PRCE classification mode as described above in conjunction with FIGS. 1 and 1A.

The network 80 may operate in an RCE-only classification mode by setting a logical indicator in each cell in the second layer to a predetermined value for which d is less than a predetermined field of influence distance about cell i. Such logical indicators may be detected serially and a corresponding output bit for each of 64 possible output classes may be set.

The neural network 80 calculates a value indicative of how well the input pattern vector matches each of the 1024 patterns stored in the memory 68. The DCU 66 includes 512 processing units which operate in parallel to calculate the city block distance d between the input vector u and each of the stored prototype vectors P.

Each distance D is compared to a field of influence value $\lambda$ associated with each prototype P. Prototypes fire when the distance d between the prototype P is less than the value $\lambda$. Thus, if the distance D is less than the field of influence value $\lambda$ a logical indicator (e.g. a bit) takes on a predetermined value to indicate that this particular prototype has fired.

Each prototype P has a class associated with it. If only one prototype fires or if only prototypes associated with one class fire, then classification may be performed in the RCE mode. Classification in the RCE mode is relatively easy since the neural network 80 may simply provide an output signal indicating the class associated with the firing prototype or prototypes. Thus, the fire/no-fire RCE classification approach works well for simple pattern classification problems where class distributions do not overlap.

When class distributions overlap, however, prototypes from more than one class are likely to fire at the same time creating uncertainty as to which class the input pattern belongs. Thus, in this instance it would be desirable to operate in the PRCE classification mode which, as mentioned above, is the second classification paradigm which may operate in the neural network 80.

In the PRCE mode of operation the math unit 70 is used in conjunction with the prototype array 68 and the DCU 66 to calculate class probabilities. The MU 70 uses the distances d calculated by the DCU 66 along with weight parameters stored during learning in the prototype array 68 to estimate the probabilities. An output signal corresponding to a class probability value may be provided by the neural network in 32 bit IEEE floating point format for example.

Final classification based on the probability values provided by the neural network 80 may be computed by a system administrator (not shown). The probabilities may be normally ranked and the most probable class may be chosen as is in common Bayesian classification.

As will be described further in conjunction with FIG. 5, in parallel when a plurality of neural networks 80 are coupled together, the consolidation of class probabilities from the plurality of networks 80 involved in classifying a single pattern may also be performed by the system administrator (not shown).

The internal (prototype) layer of the neural network 80 is common to the RCE mode and the PRCE mode. The function of the prototype layer is to evaluate the similarity between an input vector and the weights stored in the prototype layer. The neural network 80 uses the city block distance as a similarity criteria and computes this distance for each of the 1024 prototype elements (all of the same dimension) in two 512 parallel computations.

The input layer accepts an input vector and presents it to the prototype layer. Each prototype element in the neural network's internal layer is used by the DCU to calculate the city block distance between the input vector and each of the stored weights.

$$d^i = \Sigma_i |u_i - P_i^j|$$

where d is the city block distance between the input vector (u) and the stored feature example (prototype vector:p), j is the prototype element index (which may range from 1 to 1024 for example) and i is the dimension index (which may range from 1 to 256 for example). When the input vector u is similar to the stored prototype vector $p^1$, the metric $d^1$ will be small.

Defective prototype elements in the prototype array may be identified and therefore not used to commit new prototypes. Nonfunctional prototype elements may be identified during testing of the neural network and/or at commit-time. Thus, in operation the prototype array 68 appears to have no defective cells.

This ability to reconfigure the parallel array (i.e. automatically identify and avoid defective cells) ensures system integrity when the network 80 is required to operate with a prototype array 68 having defective cells or when the network 80 is required to operate over a relatively long period of time during which defects may occur in the prototype array 68.

Associated with each prototype element j is a field of influence value $\lambda^1$ to which the metric $d^1$ will be compared. When the metric $d^1$ is less than the region of influence $\lambda^1$, a match has occurred between the input vector and the stored feature example. Each prototype belongs only to one class. The class output is simply the result of performing a logical comparison between each of the relevant prototype's thresholded distance calculations. When the input vector matches a feature stored at a prototype in RCE mode of operation, when an input vector closely matches one of the prototype weights stored in the prototype array 68, one of the class outputs will provide a corresponding output signal.

In the situation when an input vector causes more than one class to produce a positive response (due to ambiguous features), the neural network will no longer provide an unequivocal classification based on the RCE strategy. In this case, the neural network could enter the PRCE classification mode. The PRCE calculations may be performed in parallel with RCE classification operations.

The neural network 80 is here able to accept 256 features presented to the input buffer 82. The features may be represented as 5 bits of a single byte. Thus, if an 8 bit byte is used, each 5 bits out of the 8 bit byte represents a single feature.

By allowing the buses 87a and 75 to transfer 20/40 bits or 32/64 bits respectively, a high degree of utilization is maintained on each of the buses 87a and 75 and the network 80 may operate in either a 32 bit or a 64 bit mode. Since 4 bytes corresponds to 20 bits, in the 32 bit mode, 4 features per cycle may be processed in the network 80. Similarly, 8 bytes corresponds to 40 bits and in the 64 bit mode, 8 features per cycle may be processed in the neural network 80. Thus, for problems requiring 256 input features, in the 32 bit mode 64 cycles would be required to load all 256 features. In the 64 bit mode, however, only 32 cycles would be required to load all 256 features.

It should be noted that the prototype array 68 may be addressed as a row column memory array (i,j) similar to a core memory. However, the prototype array 68 is parallel addressable. Here the prototype array 68 is taken to be 256 rows ×1024 columns and the features are represented by 5 bits. One of ordinary skill in the art, however, will recognize that the techniques described herein are applicable to prototype arrays 68 of varying dimensions. Likewise, the input buffer 64 and the prototype parameter RAM 72 may each be provided having appropriately selected dimensions and a corresponding number of memory locations. Likewise, the DCU 66 may be provided having an appropriately selected number of computation units. Similarly, each of the buses to be described in conjunction with FIG. 4A below would be provided having an appropriately selected bus width. Furthermore, and as mentioned above, although each feature of the input vector is here represented by 5 bits the features may alternatively be represented by fewer or more than 5 bits.

The distances calculated in the DCU 66 are stored in DCU memory register 66a having one thousand twenty four 13 bit registers. The DCU register 66a may be provided, for example, by a pair of 512 13 bit registers such that computations may begin in the math unit 70 while distance calculations are being performed in the DCU 66.

Figure 4A:
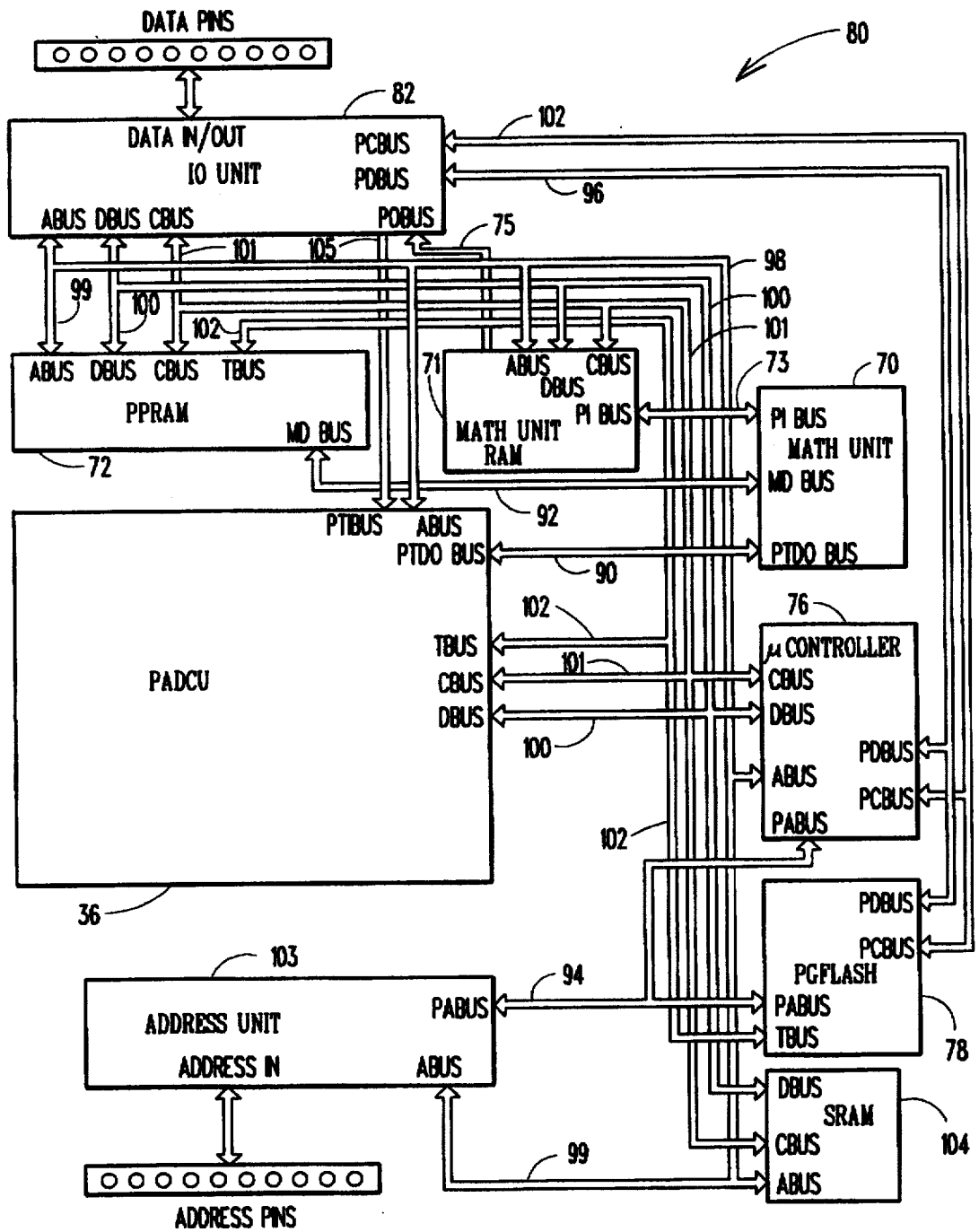
FIG. 4A is a block diagram of a bus architecture used in the neural network of FIG. 4.

Referring now to FIG. 4A in which like elements of the neural network 80 described above in conjunction with FIG. 4 are provided having like reference designations, the neural network 80 includes a plurality of buses. A control bus (CBUS) 101 is coupled between the I/O unit 82, the microcontroller 76 and an SRAM 104 which provides a workingRAM for the microcontroller 76. The control bus 101 controls data loading from an external system (not shown) into the microcontroller program memory 78.

A data bus (DBUS) 100 is also coupled between the I/O unit 82, the microcontroller 76 and the program memory 78. Data from an external source (not shown) is loaded into the microcontroller program memory through the data bus 100. The data bus 100 is coupled to the microcontroller because in a test mode and special control modes of the network 80, the microcontroller 76 accesses the data bus 80 to control operations in the network 80.

The microcontroller 76 is provided having separate memory space for storage of program and data space information. Thus, an address bus 99 coupled between the I/O unit 82, the prototype parameter RAM 72, the microcontroller 76, an SRAM 104, and an address unit 103 permits the microcontroller 76 to address any memory mapped unit in the neural network 80. The address unit 103 permits an external source device to access the neural network elements connected to the address bus 99.

A program counter address bus 94 coupled between the address unit 103, the program memory 78 and the microcontroller 76 permits the microcontroller 76 to address program memory. The program counter address bus (PABUS) 94 may also be controlled by the address unit 103 when loading data from an external system.

A data bus (DBUS) 100 and a control bus (CBUS) 101 are each coupled between the I/0 unit 82, prototype parameter RAM 72, math unit 70, PADCU 86, the microcontroller 76 and the SRAM 104. The data bus allows the transfer of data between any memory mapped unit in the network 80. Here the data bus 100 is provided as a 16 bit bus. The control bus allows examination of the state of major units within the network.

An analog test access bus (TBUS) 102 coupled between the prototype parameter RAM 72, PADCU 86, and program memory 78 is used as a test bus for each of the flash memory elements the neural network 80 and also provides access to the prototype parameter RAM 72. The test bus 102 permits analog signals within the neural network to be examined.

A prototype input bus (PTIBUS) 105 coupled between the I/O unit 82 and the PADCU 86 allows data to be transferred, one feature at a time to the DCU. The prototype input bus 105 is dedicated to such transfers.

A memory data bus (MDBUS) 92 coupled between the PPRAM 72 and the math unit 70 enables the math unit 70 to access all three prototype parameter memories simultaneously. Here the memory data bus 92 is provided as a 48 bit bus.

An output bus (POBUS) 75 is coupled between the math unit RAM 71 and the I/O unit 82 is dedicated to transferring data from the math unit RAM 71 to the output portion of the I/O unit 82.

A PTDO bus 90 coupled between the PADCU 86 and the math unit 70 is used to access the distance registers in the DCU and transfer data to the math unit 70.

Data is transferred between the math unit and the math unit RAM via a two way PI bus 73.

The microcontroller 76 uses separate address and data buses (PABUS and PDBUS) to access it program memory. All other memory blocks and registers on the neural network 80 may be accessed via the ABUS 99 and DBUS 100. The control registers used to control the program memory 78 during programming are accessible only through the external bus interface.

Figure 5:
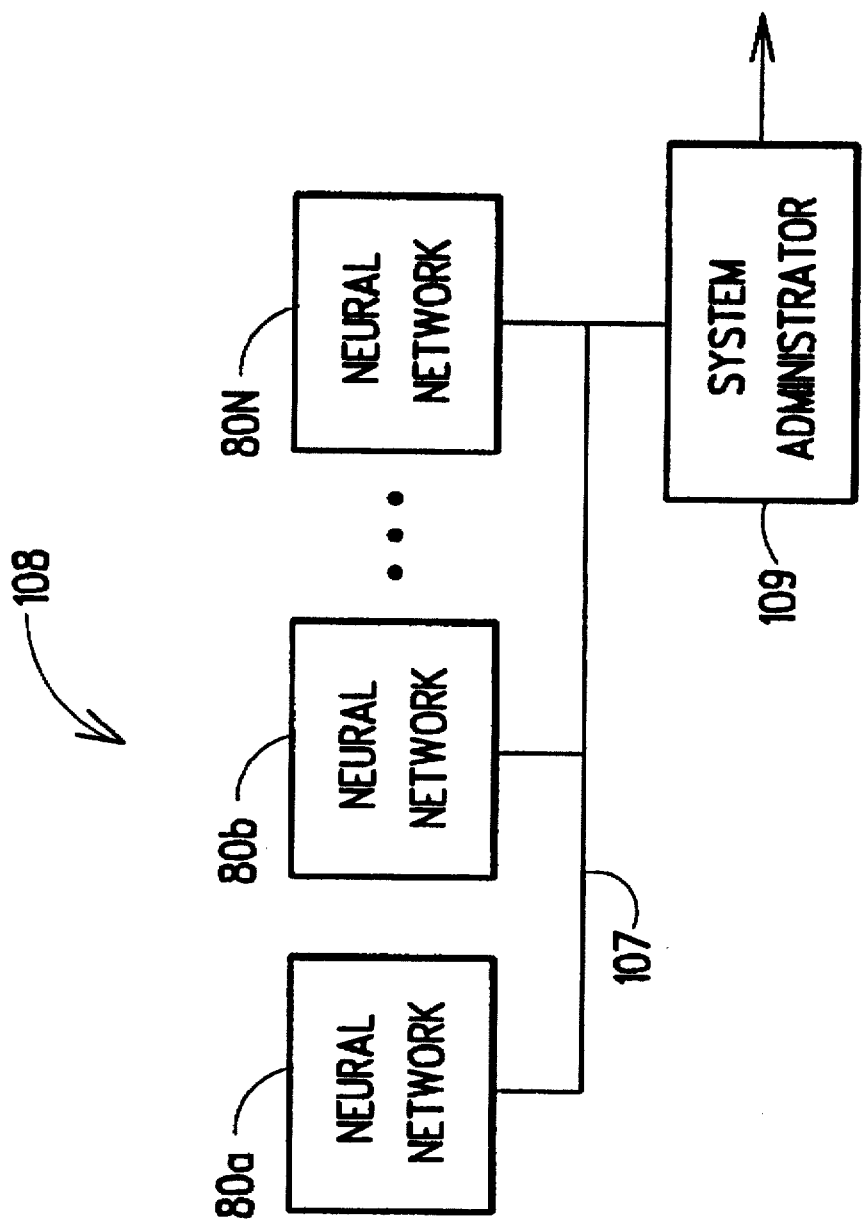
FIG. 5 is a block diagram of a neural network array.

Referring now to FIG. 5, in which like elements of the neural network 80 of FIG. 4 are provided having like reference designations, a neural network array 108 includes a plurality of separate neural networks 80a–80n, generally denoted 80, coupled to a system administrator 109 through address and data bus 107. The system administrator 109 may be provided for example as a personal computer or high speed controller and is used to handle conflicts and communication when more information is required than is already available in an autonomous neural network. The system administrator 109 also controls the flow of I/O to the neural network array 108, and may configure the neural networks 80 into one of a plurality of possible architectures.

The system administrator 109 may be provided as a controller similar to the type described in U.S. Pat. No. 4,760,604 assigned to the assignee of the present invention and incorporated herein by reference.

Generally, the system administrator 109 receives inputs from each of the networks 80 and provides an output signal at an output port thereof. It may be desirable to use such an array of neural networks 80 in those applications having a relatively complex feature space such that the number of prototypes is greater than that which may be stored in one network 80.

As training vectors are presented to the neural network array 108, prototype elements are autonomously assigned until only a single prototype memory element (i.e. 256 five-bit cells) is available. This operation is substantially the same for both single neural network systems and array neural network systems.

In the array environment, however, the act of committing the last prototype memory space causes a signal to be provided to the system administrator 109 to indicate to the system administrator that another unprogrammed network 80 must be placed in the learning mode. This process continues until each of the networks 80 in the array 108 indicates that each of the prototype elements the corresponding prototype array is committed. In a single network system, this occurs when each of the prototype elements in the neural network prototype array 68 is filled.

At this point the system administrator 102 intervenes to indicate that the problem cannot be defined with the given number of networks 80 in the array 108. A user of the system then has several options. First the user may assume that the problem is sufficiently defined to begin classification. Second, the user may add an additional network 80 to the array 108. Third, the user may reorder the training set and attempt to learn it again, or fourth the user may be more selective in choosing the training set.

When committing new prototypes during the learning phase, it is required to initialize the new field of influence to be equal to the new prototype's distance to the closest, already-stored prototype. This distance is denoted $D_{min}$, and it is required to transmit the $D_{min}$'s of all the networks 80 (the $D_{minlocal}$'s) to the system administrator to find the global $D_{min}$ (denoted as $D_{minglobal}$). This value is then relayed to the chip which will commit the new prototype and the value of the field of influence is instantiated. In a classification mode, a normalization factor Q is dependent on the resultant unnormalized probability density from each class. In this case, the Q's from each of the neural networks 80 should be summed to generate the global system normalization factor, $Q_{global}$. The probability values $P_j$ are then divided by $Q_{global}$ to create normalized probabilities.

One problem in network arrays which slows the operation of such arrays is the transmission of $D_{minlocal}$ the learning phase, and the transmission of 64 $P_{local}$'s and the $Q_{local}$ during the classification phase. Each of the neural networks 80 in the neural network array 108 supports a protocol in which the local controller 109 provides the $D_{minlocal}$ values from each of the neural networks 80a–80n to all of the other networks 80a–80n. Thus, the neural network 80a, for example, receives the $D_{minlocal}$ values from each of the other networks 80b–80n in the network array 109. Each of the neural networks 80a–80n then determine which of the $D_{minlocal}$ has the smallest value. The system administrator 109 thus distributes all the $D_{minlocal}$ values to each of the networks 80a–80n where the appropriate computations are made.

When required, the system administrator 109 polls each chip, prompting it to release its $D_{min}$ (during learning) or P (during probabilistic classification) to the bus 107. This allows the system administrator 109 to access the data as required. Each of the networks may be accessed individually, such that only a single neural network 80 gains access to the bus 107 during a predetermined time interval.

Figure 6:
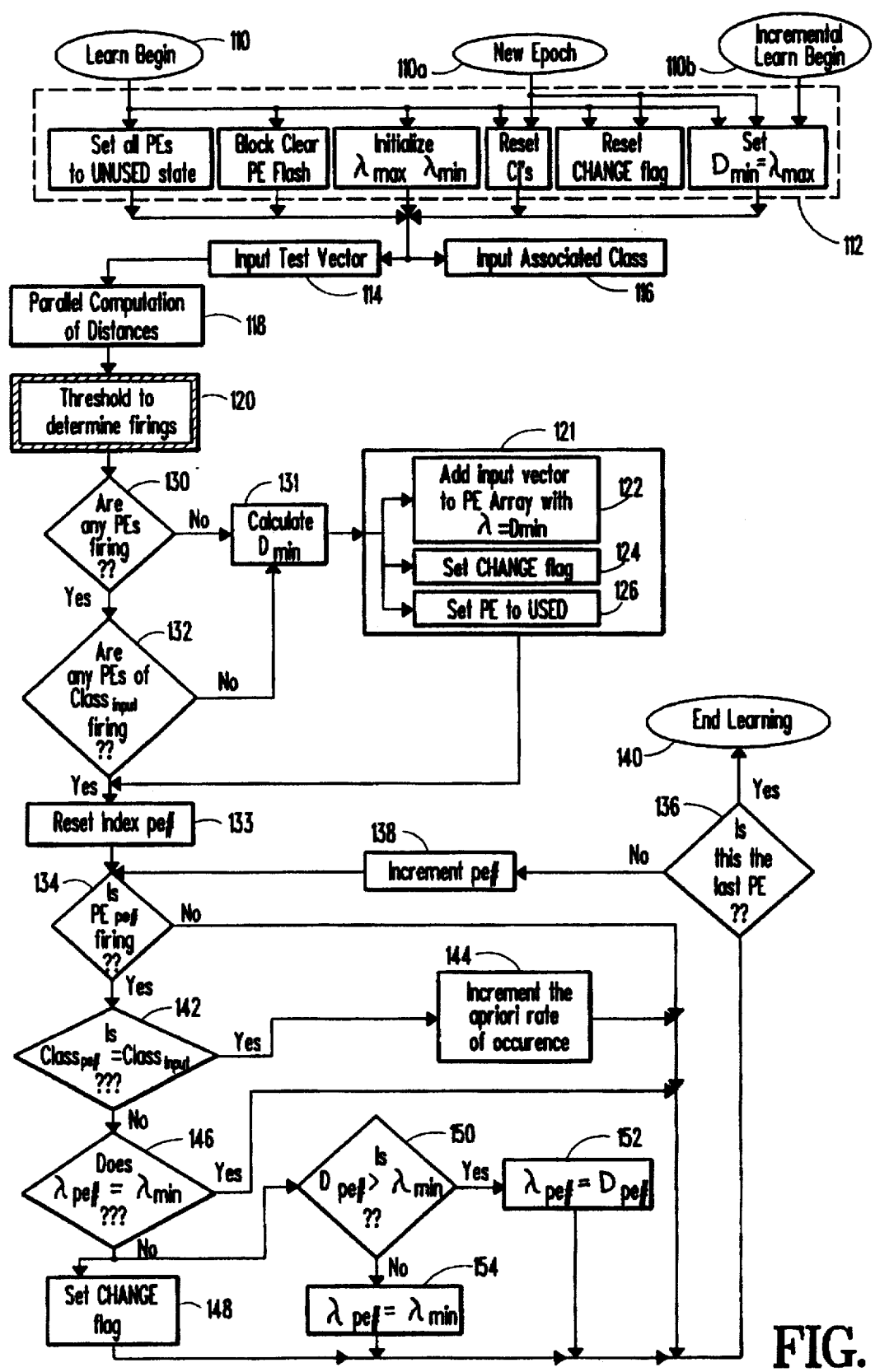
FIG. 6 is a flow diagram of the learning mode processing performed in the neural network of FIG. 4.

FIG. 6 shows a flow diagram of the processing performed in the DCU 66 (FIG. 4) and the math unit 70 (FIG. 4) of the neural network 80 (FIG. 4) to produce prototype values which may be stored in the prototype array 68 (FIG. 4). In the flow diagram, the rectangular elements (typified by element 114) herein denoted "processing blocks" represent steps or instructions or groups of instructions. The diamond shaped elements (typified by element 130) herein denoted "decision blocks" represent steps or instructions or groups of instructions which affect the execution of the steps represented by the processing blocks.

The neural network 80 uses information stored in the prototype memory array and prototype parameter memory described above in conjunction with FIGS. 3–4A above, to carry out its classification calculations. The process by which prototypes are provided to the prototype array memory is generally referred to as learning or adaptation. The term learning is used because the process is related to human learning.

Prior to the use of the neural network for classification, the neural network is placed in a learn mode via a learn command and example patterns are presented to the neural network along with a correct identification of the class to which each pattern belongs. The microcontroller examines the classification results and compares them to the desired classification. The microcontroller then decides how to change the information stored in the neural network. The microcontroller may store the example vector as a prototype vector in the prototype array or the microcontroller may modify the parameters associated with some of the prototypes which have already been stored in the prototype array memory. Nonvolatile flash memory may be used to store information captured during learning. The learning controller's program may also be stored in a flash memory.

As described in detail in U.S. Pat. No. 4,326,259 assigned to the assignee of the present invention and incorporated herein by reference, RCE learning is a process of committing a set of prototypical weights from training data and assigning an appropriate field of influence $\lambda_i$ and threshold value for which those weights are representative. During the learning mode, the neural network determines if a new input vector is a prototypical example. If the new input vector is a prototypical example, then the network commits a new prototype element and assigns the prototype element an appropriate influence field $\lambda$. Concurrently, an attempt is made to reduce the value of the fields of influence $\lambda$ of other prototype elements until conflicts with the new prototype element are avoided. This procedure of reducing influence fields $\lambda$ continues until a predetermined minimum influence field value $\lambda_{min}$ is reached.

In the present invention, to address the case when class boundaries overlap and a probabilistic response is desired, probability density functions may be computed in the learning mode. The apriori rates of occurrence are computed using the training feature examples. The neural network assumes a distribution function which takes the form of a decaying exponential for the purpose of learning.

As described above in conjunction with FIG. 4 the neural network 80 may operate in one of a plurality of classification modes. For example, the network may operate in the RCE and PRCE classification modes.

Multiple passes through the training examples are employed in the learning process. Each pass is referred to as an "epoch". In the present invention, during each epoch in the learning mode, the network assembles all information, including probabilistic information, needed for the neural network to operate in each of the plurality of classification modes. Thus, with no additional delay in training time, the network is able to operate in a plurality of classification modes e.g. either the RCE or PRCE classification modes.

Several iterations (typically in the range of about 3–6 iterations) of the data (i.e. epochs) may be required to achieve system stability. That is, several iterations may be required before no new prototype elements are added to the network and none of the regions of influence are adjusted. The probabilistic information obtained during learning is not used until the network operates in the classification mode. In the classification mode, if a conflict among the output classes occurs the probabilistic information may then be used.

Other learning algorithms, such as the Probabilistic Neural Network (PNN) learning algorithm for example, may optionally be used by downloading microinstructions to a user-accessible portion of the microcontroller's program flash memory array. The user may access the new algorithm in a manner identical to the manner in which RCE/PRCE learning algorithms are accessed and thus use the alternate algorithm in place of the standard learning code. If alternate algorithms having mathematical operations similar to the RCE learning algorithm are used, maximized performance of the parallelized computation scheme described above may be maintained.

Turning now to FIG. 6, entry point 110 initiates an initial learning step. In respprototype m initial learning step all prototype memory will be initialized and overwritten. Thus, the initial learning step should only be used for an initial input vector of an initial epoch provided to the network 80. Subsequent learning steps should be initiated via the new epoch or incremental learning entry points 110a, 110b.

Processing block 112 performs an initialization procedure to indicate that the learning mode is beginning. Depending upon which of the entry points 110–110b are used to begin processing at the first learning process step, particular values are initialized. For example if the learning process is initiated through entry point 110 then in initialization processing block 112, all prototypes are set to indicate an unused state, the memories are cleared and the value $D_{min}$ is set equal to a maximum region of influence value $\lambda_{max}$.

In processing blocks 114 and 116 an input vector from a training set and an associated class is presented to the network. The input vector is latched from the data bus and stored in the input buffer.

In processing block 118 the DCU performs a parallel computation of the distances between the current input vector and each of the prototypes stored in the prototype array. Processing then continues in processing block 120 where computations of threshold values to determine which prototypes stored in the prototype array activate are performed.

After the threshold values are computed, in decision block 130 the neural network checks to see if any prototypes stored in the prototype array are firing. If no prototypes are firing then processing continues in processing block 131 where a minimum distance $D_{min}$ is computed. Processing then continues in commitment processing block 121 and the operations in processing blocks 122, 124 and 126 are performed.

In processing block 122 an input vector having a region of influence $\lambda = D_{min}$ is added to the prototype array. In processing block 124 a CHANGE flag in a register is set. When the CHANGE flag is set, this indicates that another training epoch is required. The CHANGE flag may be set in response to either one of two conditions being met. First, the CHANGE flag is set if a new prototype is added to the prototype array. Second, and as will be described in conjunction with processing block 148, the CHANGE flag is set if the value of a region of influence for any prototype is adjusted. After the appropriate operations are performed in processing block 121 processing continues to processing block 133.

If at least one prototype is firing however, then processing flows to decision block 132 where the neural network checks to see if any prototypes of the same class as the input vector are firing. The computations necessary to determine such classifications are performed in pipeline fashion. If no prototypes of the same class as the input vector fired, then processing again flows to processing blocks 131 and 121 where processing steps as described above are performed.

Regardless of whether any prototypes of the input class are firing, processing then continues in processing block 133 where an index pe# is reset. The index pe# is used as a loop counter to be certain that each of the prototype elements are accessed.

Decision blocks 134, 136 and processing block 138 implement a loop in which each prototype element P is checked to see if it has fired. The loop and consequently the learning process end in processing block 140 after each of the prototype elements has been checked.

Thus, decision block 134 checks to see if a particular prototype $P_{pe\#}$ defined by the index pe# is firing. If the particular prototype $P_{pe\#}$ defined by the index pe# is not firing then processing continues to decision block 136 to check if this prototype is the last prototype. If it is the last prototype then learning ends as shown in processing block 140.

If it is not the last prototype, then processing continues in processing block 138 where the index pe# corresponding to the prototype number is incremented and decision block 134 checks to see if the next prototype is firing. This loop continues until all the prototypes are checked.

If a prototype is firing, then in decision block 142 the class of the prototype $Class_{pe\#}$ is compared to the class of the input vector $Class_{input}$. If the class of the current prototype $class_{pe\#}$ is the same as the class of the input vector $Class_{input}$ then the apriori rate of occurrence for that class is incremented in processing block 144. For overlapping class distributions, pdfs may be estimated by maintaining a count of correctly classified patterns which fall within the region of influence of each of the middle layer of cells. This local counter of correctly classified patterns is stored in the second layer weight $\omega^2_{ij}$ which links the $j^{th}$ cell of the middle layer with the $i^{th}$ output cell. Thus during training, correctly identified patterns of class i, which elicit activity in middle-layer cell j, cause an increment to the value of the weight $\omega^2_{ij}$ (t) as shown in Equation 9 in which t represents time.

$$\omega^2_{ij}(t+1) = \omega^2_{ij}(t) + 1 \qquad \text{Equation (6)}$$

Patterns which are not correctly identified by middle-layer cell j do not alter the value of the weight $\omega^2_{ij}$ (t). It should be noted that since the field of influence $\lambda_j$ of cell j may be reduced as a result of RCE learning, the counter $\omega^2_{ij}$ may not provide an accurate estimate of correctly identified patterns during RCE training. Thus to ensure that the second layer of weights correctly estimate the local pdfs, it may be preferable to perform a final pass on the full training set in which no addition of second layer cells and no adjustment of the field of influence $\lambda$ of any cell occurs.

If in decision block 142 the class of the current prototype $Class_{pe\#}$ is not equal to the class of the input vector $Class_{input}$ then processing continues to decision block 146 where a check is made to determine if the value of the field of influence $\lambda_{pe\#}$ around that particular prototype is set to the minimum value $\lambda_{min}$. If the value of the field of influence $\lambda_{pe\#}$ is set to the minimum value $\lambda_{min}$ then processing continues to decision block 136.

If the result of decision block 146 indicates that the value of the field of influence $\lambda_{pe\#}$ is not set to the minimum value $\lambda_{min}$, then the change flag is set in processing block 148 to indicate that the value of the region of influence $\lambda_{pe\#}$ of this particular prototype has been adjusted.

In decision block 150 the distance of the current prototype corresponding to the present value of index pe#, $D_{pe\#}$ is compared to the value of the minimum region of influence $\#_{min}$. If the value of the distance $D_{pe\#}$ is greater than the minimum region of influence value $\#_{min}$, then the value of the region of influence for this particular prototype $\lambda_{pe\#}$ is set equal to the computed distance value $D_{pe\#}$ as shown in processing block 152 and processing then continues to decision block 136.

If in decision block 150 the value of the distance $D_{pe\#}$ is less than the minimum allowable value of the field of influence $\lambda_{min}$, then value of the field of influence for this particular prototype $\lambda_{pe\#}$ is set equal to $\lambda_{min}$ as shown in processing block 154 and processing then continues to decision block 136.

If an output cell of a different class than the input pattern is activated, then the field of influence values $\lambda$ of the middle-layer cells which activated the output cell are adjusted such that those cells are no longer activated by the pattern. In addition, if none of the middle-layer cells connected to the correct output cell are active, then a new cell is added to the network with weights $\omega_{ij}$ which correspond to the location of the pattern.

At the same time, the new cell is connected to the corresponding output layer cell with a unit weight. The value of the field of influence of the new cell is then initialized to the distance between the input pattern and the nearest weight vector of a cell belonging to another class.

As a result of the learning procedure, the cells of the second layer of the network form a "covering" of the class regions that can represent arbitrarily non-linear interclass boundaries. This mapping of the training data distributions typically requires from three to six passes through a randomly ordered training set, depending of course upon a variety of factors including but not limited to the complexity of the distributions and the ordering of the data in the training set.

Figure 7:
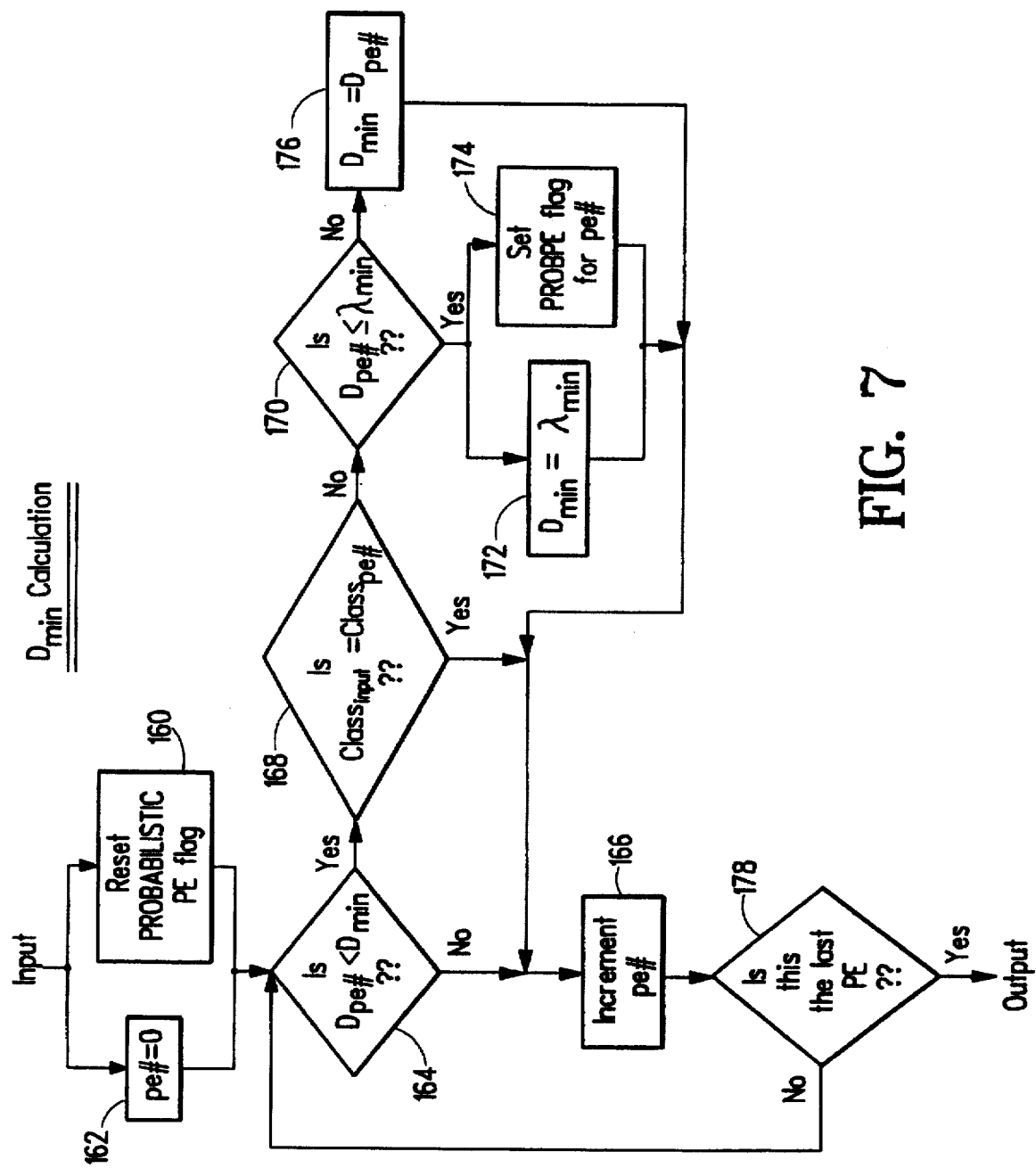
FIG. 7 is a flow diagram of the processing performed in the neural network of FIG. 4.

Referring now to FIG. 7, a flow diagram of the processing performed by the neural network 80 (FIGS. 4 and 4A) to compute the distance $D_{min}$ between an input pattern and all the prototypes not in the same class is shown. Processing block 160 indicates whether the minimum distance $D_{min}$ is equal to the minimum field of influence $\lambda_{min}$. In processing block 162 the prototype index pe# is initialized.

In decision block 164 the distance value $D_{pe\#}$ is compared with the current minimum distance value $D_{min}$. If the value of $D_{pe\#}$ is greater than the value of $D_{min}$ then processing continues to processing block 166 where the prototype index is incremented. If the value of $D_{pe\#}$ is less than the value of $D_{min}$ then processing continues to decision block 168 where $Class_{input}$ is compared to $Class_{pe\#}$. If $Class_{input}$ equals $Class_{pe\#}$ then processing again flows to processing block 166. If $Class_{input}$ is not equal to $Class_{pe\#}$ then processing flows to decision block 170 where the value of $D_{pe\#}$ is compared with the value of $\lambda_{min}$.

If the value of $D_{pe\#}$ is less than or equal to the value of $\lambda_{min}$ then the value of $D_{mim}$ is set equal to $\lambda_{min}$ in processing block 172 and the PROBABILISTIC PE flag is set in processing block 174 to indicate that the value of $D_{min}$ equals the value of $\lambda_{min}$. Processing then flows to processing block 166 where the index counter pe# is incremented.

If the value of $D_{pe\#}$ is greater than the value of $\lambda_{min}$ then processing flows to processing block 176 and the value of $D_{min}$ is set equal to the value of $D_{pe\#}$ and processing again flows to processing block 166.

After the prototype number is incremented in processing block 166, decision block 178 implements a loop to repeat the steps above until each prototype has been processed.

Figure 8:
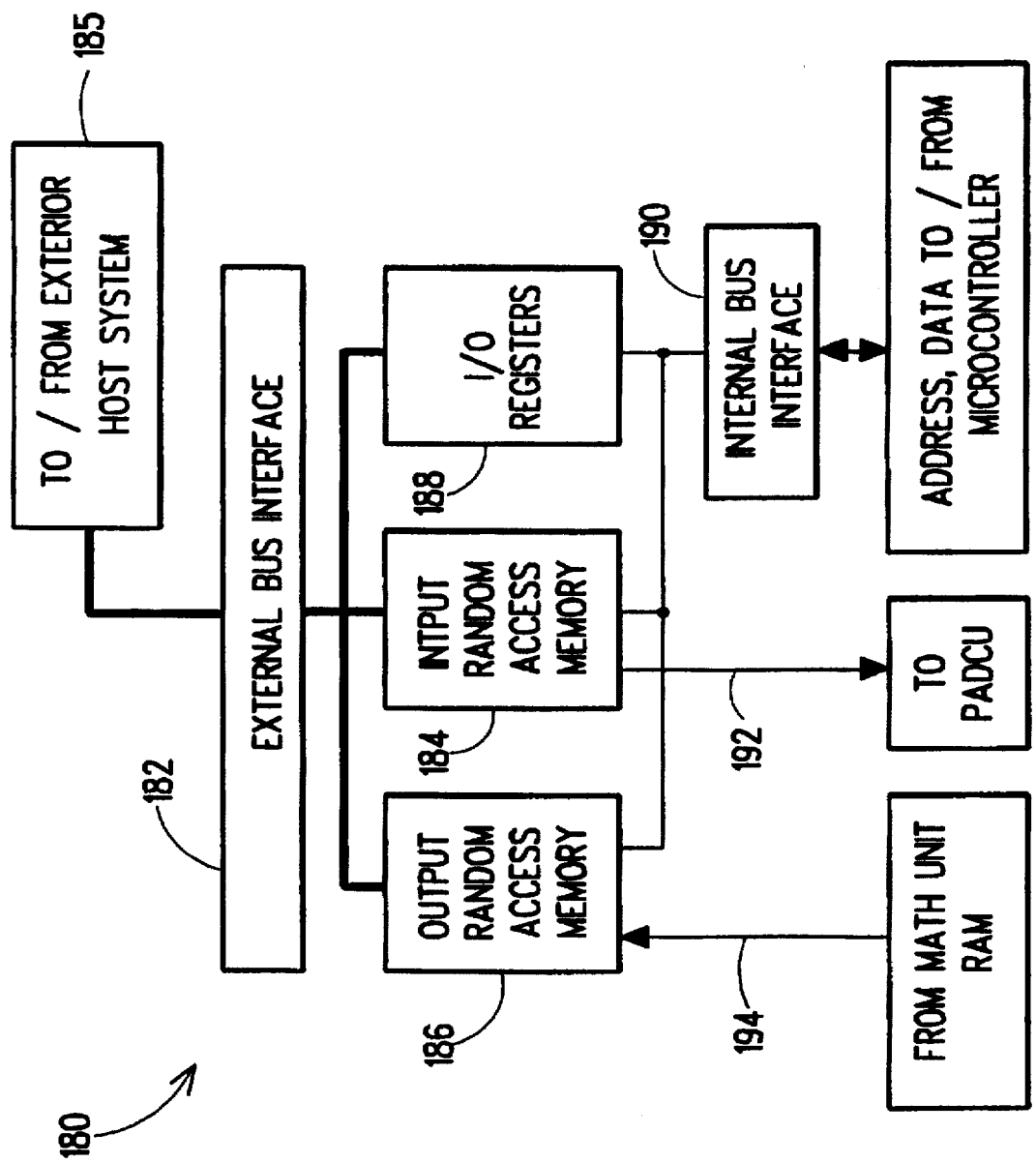
FIG. 8 is a block diagram of the input/output random access memory in the neural network of FIG. 4.

Referring now to FIG. 8 the I/O unit 180 of the neural network includes an input RAM buffer (IRAM) 184 which receives from a host system 185 pattern vectors for classification. The I/O unit further includes the output RAM buffer (ORAM) 186 which receives classification results from the neural network's internal classification pipeline and stores the results prior to transferral of the results to the host system 185. The I/O unit 180 further includes input/output (I/O) registers 188, which have the dual function of controlling the operating modes of the IRAM 184 and ORAM 186, and of acting as "mailboxes" to communicate information between the host system and the neural network's internal elements (e.g. the neural network microcontroller).

The IRAM 184, ORAM 186 and I/O registers 188 comprise the three principal external data path elements of the neural network 80 (FIG. 4). These three sub-units of the I/O unit 180 communicate with the host system 185 through an external bus interface (XBI) 182. These three sub-units of the I/O unit 180 also communicate with the microcontroller through an internal bus interface (IBI) 190.

When the network 80 (FIG. 4) operates in a classification mode, a first direct interface 192 exists between the IRAM 184 and the PADCU 86 (FIG. 4). Similarly a second direct interface 194 exists between the math unit RAM 71 (FIG. 4) and the ORAM 186.

Figure 9:
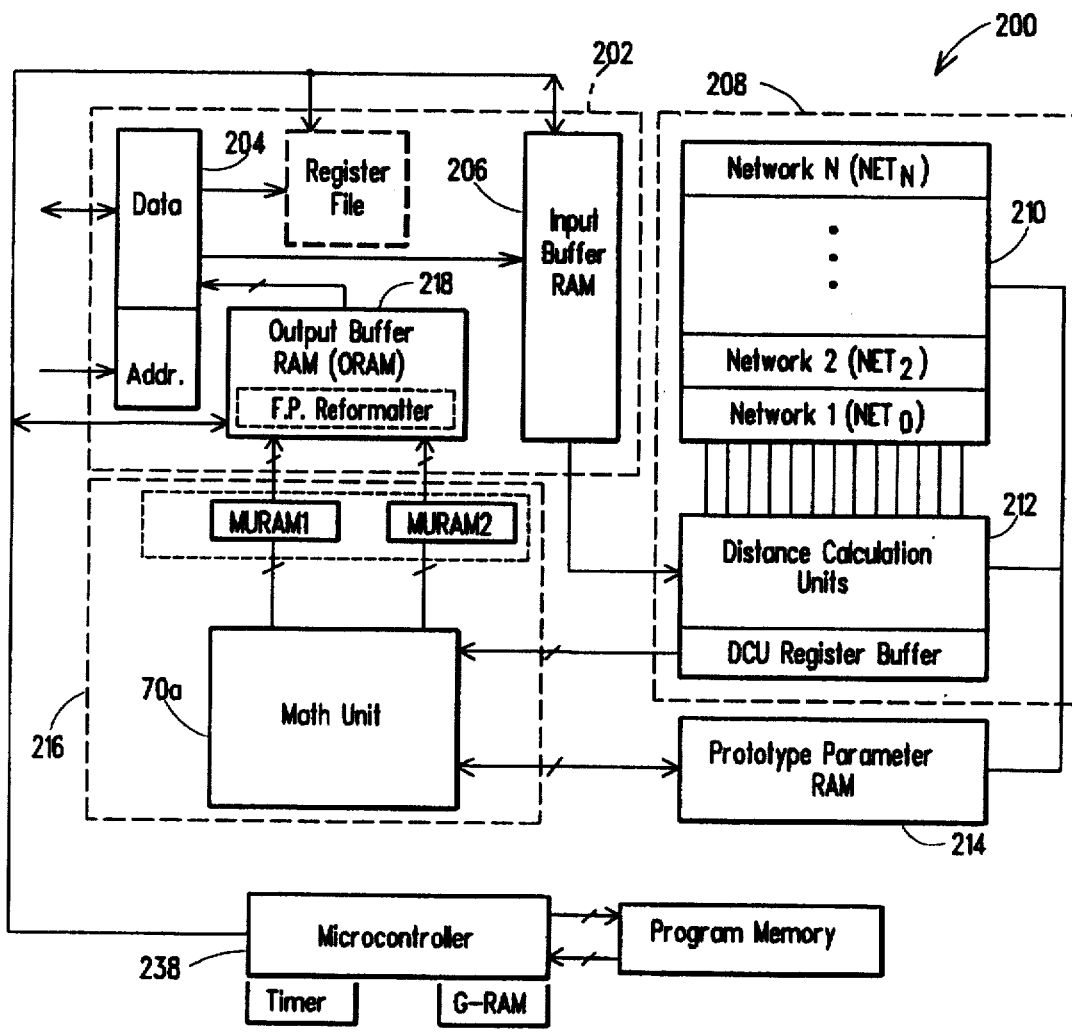
FIG. 9 is a block diagram of a multiple network neural network.

Referring now to FIG. 9, a multiple-network neural network (MNNN) 200 includes an input/output (I/O) unit 202 for transferring data to and from network 200 and a controller 238 or any external devices coupled thereto. The I/O unit 202 receives data through a data latches 204 and couples the data to an input buffer 206. The data buffer 206 provides the data to a prototype array-distance calculation unit (PADCU) 208.

The PADCU 208 includes a prototype memory array (PA) 210 coupled to a distance calculation unit (DCU) 212. The PA 210 and DCU 212 may be similar to the PA 68 and DCU 66 described above in conjunction with FIGS. 4 and 4A. The memory 210 is provided having a plurality of different neural networks or simply sub-nets $SUBNET_0$–$SUBNET_N$ stored therein. The particular manner in which the subnets $SUBNET_0$–$SUBNET_N$ are stored in the PA 210 will be described in detail below in conjunction with FIGS. 9A–14. Furthermore, methods to train the neural network 200 and to generate and store the subnets $SUBNET_0$–$SUBNET_N$ in the memory 210 will be described further below in conjunction with FIGS. 13 and 14. Suffice it here to say that each of the different sub-nets $SUBNET_0$–$SUBNET_N$ correspond to a different organization of neurons and weights within the memory 210.

The PADCU 208 and a prototype parameter random access memory (PPRAM) 214 are coupled to a math unit 216 and provide input data thereto. The math unit 216 receives the input data fed thereto and performs computations and operations in a manner similar to the math unit 70 described in conjunction with FIGS. 4–7 above. The math unit 216 subsequently feeds output data to an output buffer portion 218 of the I/O unit 202 which includes an output RAM (ORAM).

The multiple network neural network 200 may have a plurality of sub-nets stored therein with each of such sub-nets requiring less than all of the available input features and weights of the neural network 200. Thus, the multiple network neural network 200 may be particularly useful in those classification applications which do not require all of the available input features and weights of the neural network.

For example, in a neural network having 1024 prototype bodies and capable of accepting 256 feature inputs, some applications may require only 64 input features and corresponding weights. Thus, in such an application a portion of the inputs and weights in neural network 200 may be left unused.

It may be desirable in such an application to utilize the unused inputs and weights and reuse the 1024 prototype bodies by training the neural network 200 to recognize a second application which may require, for example, only 64 or 128 input features. Training a single neural network integrated circuit to operate in a multiple-network neural network mode provides several advantages including reduced cost and size in those applications which would otherwise require a plurality of separate neural network integrated circuits or systems.

For example, if the neural network 200 is provided as an integrated circuit, the multiple-network neural network technique may provide a substantial reduction in the amount of space required on a printed circuit board having such an integrated circuit disposed thereon. That is, in the conventional approach each of the sub-nets $SUBNET_0$–$SUBNET_N$ would be stored on separate integrated circuits. Thus, in the conventional approach N separate integrated circuits would be required.

In the present invention, however, each of the sub-nets $SUBNET_0$–$SUBNET_N$ may be stored in the PA 210 of the single neural network integrated circuit 200. Thus, fewer neural network integrated circuits are required to accommodate N networks. Consequently, a corresponding savings in space on the printed circuit is provided.

Furthermore, storage of several sub-nets in the PA 210 (FIG. 9) provides the network 200 having greater efficiency. Since there is a limited amount of memory available due to current technology limits in the manufacture of state-of-the-art integrated circuits, it is important to allocate and re-use knowledge and thus provide greater efficiency and greater efficient use of the memory. This may be accomplished under control of the microcode.

Moreover, providing a plurality of sub-nets on a single integrated circuit leads to an increase in the classification speed of the circuit and a substantial reduction in host-overhead. The reduction in host-overhead results from the fact that the microcontroller acts like the host controller and thus the host need not manage the sub-nets. That is the microcontroller can direct the flow of data between each of the sub-nets.

Thus, the technique of the present invention provides a cost savings due to the reduced number of neural network integrated circuits which are used and the technique of the present invention improves the classification speed of the circuit and also leads to more efficient use of space on a printed circuit board.

Conceptually and as will be further described in conjunction with FIG. 9A, the PADCU 208 is divided into sectors. Each sub-net stored in the PA 210 may be provided as a single sector or as a horizontal and vertical combination of sectors. Furthermore, each sub-net include an arbitrary number of sectors and thus may be an arbitrary length of the PADCU 208. Thus each sub-net is a separate neural network stored in one or more sectors of the PA 210.

Although no predetermined partitioning of the PA is required to store sub-nets, in the interest of keeping the PADCU circuitry relatively simple, the sub-nets should preferably be provided from coinciding horizontal and vertical sectors with each sector representing a group of prototype weights and input vectors.

In the present embodiment each of the sub-nets $SUBNET_0$–$SUBNET_N$ must be provided by contiguous sectors. The contiguous sector limitation is required due to hardware limitations. If the partitioning of the PADCU were exclusively under microcode control, the contiguous sector limitation would not exist and the arrangement and shape of sectors which provide a particular sub-net could be arbitrary. In the present embodiment, however, $SUBNET_0$–$SUBNET_N$ are provided having rectangular shapes and do not have irregular shapes.

Referring now to FIG. 9A a prototype memory array 210' is shown partitioned into 64 sectors which have been arbitrarily labelled in hexadecimal base with sequential reference designations 0–3F for the present description. It should be noted that the reference designations do not represent a particular order in which the sectors should be accessed. The first row and column of each sector 0–3F can potentially be the starting point for one of a plurality of sub-nets $SUBNET_0$–$SUBNET_N$. Thus, depending upon the number of features and the number of prototypes, the PA 210' can potentially hold features for up to 64 different sub-nets.

In the present embodiment, each sector is provided from 128 columns of PA memory with each of the columns having 32 rows.

A sub-net will occupy at least a portion of a sector in the PA 210'. Each sub-net is identified by the number of the PA sector whose first row and column correspond to the first row and column of that particular sub-net. For example, in the PA 210' $SUBNET_0$ includes sectors 0, 1, 2, 8, 9, A, 10, 11, 12, 18, 19, 1A, 20, 21 and 22. Column 0 and row 0 correspond to the starting column and row numbers for $SUBNET_0$. $SUBNET_{28}$ includes sectors 28, 29, 2A, 30, 31, 32, 38, 39 and 3A. Column 640 and row 0 correspond to the starting column and row numbers for $SUBNET_{28}$. Similarly, $SUBNET_3$ includes sectors 3, 4, B, C, 13, 14, 1B, 1C, 23, 24, 2B, 2C, 33, 34, 3B and 3C and $SUBNET_5$ includes sector 5, 6, 7, D, E, F, 15, 16 and 17.

Figure 10:
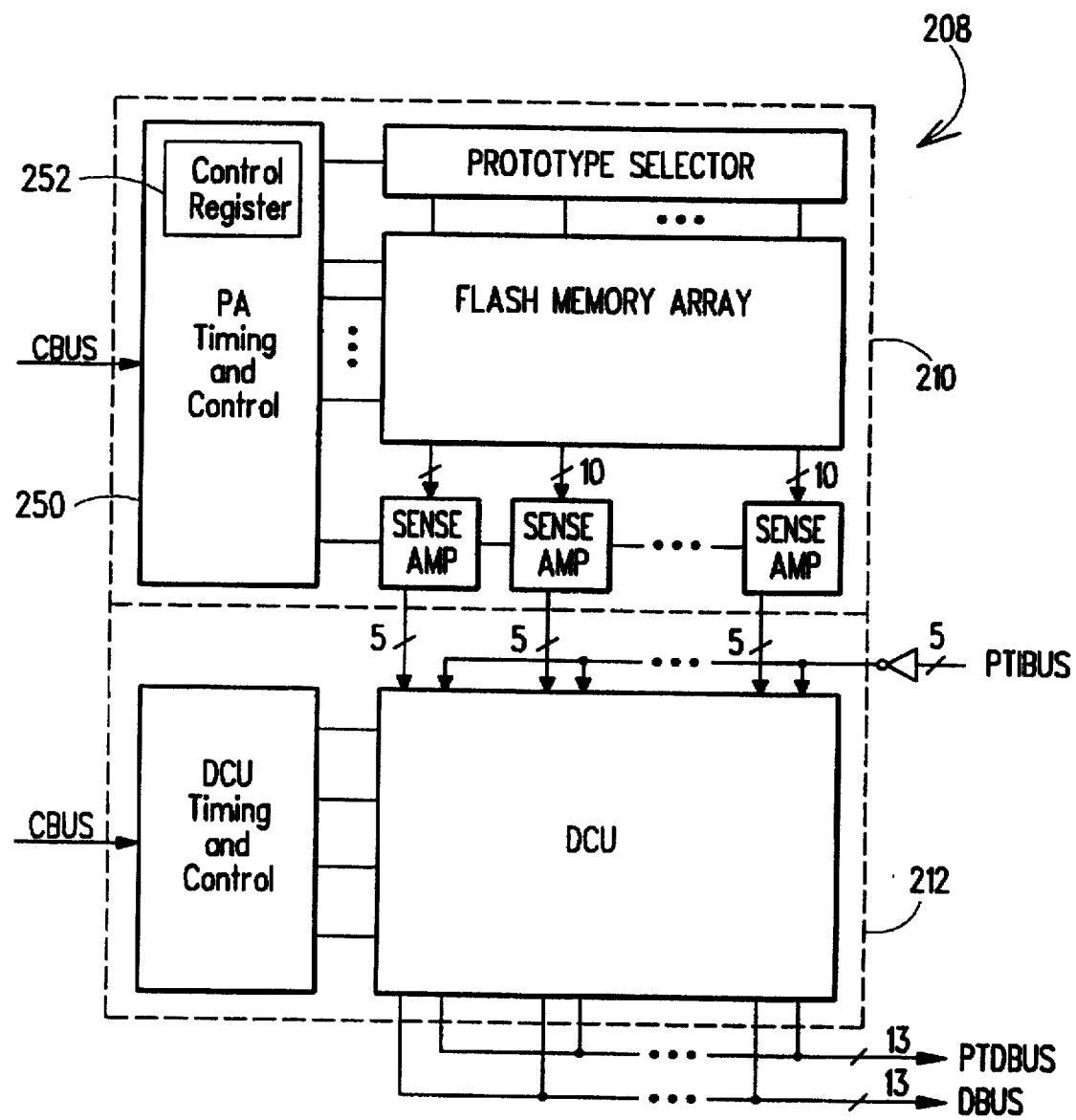
FIG. 10 is a block diagram of a prototype memory-distance calculation unit.

Referring now to FIG. 10, the PADCU 208 is shown in more detail to include a PA timing and control circuit 250 which includes an ARR register 252. The ARR 252 is an 8 bit register. As described above, the PA 210 is divided into 64 sectors and each sector includes 128 columns with each column having 32 rows. Thus, in the present embodiment the PA is partitioned into 8 sector columns. Similarly the PA is divided into 8 sector rows.

The ARR 252 has 3 bits which identify which of the 8 column addresses corresponds to the starting column address for a particular sub-net. The three bits of the ARR determine an offset address which is used by the prototype selector to identify the starting column address for a particular sub-net. A second three bits of the ARR 252 indicate the beginning row offset number and thus are used by the prototype selector to identify the starting row address for a particular sub-net. The ARR 252 also has one enable bit for column relocation and one enable bit for row relocation. The enable bits are set depending upon whether or not the relocation is used for column or row while the three bits for column and row instruct where the relocation is to be done. Thus, the PADCU_ARR register 252 provides the offset starting row and column numbers for the sector of the prototype array being used by the currently active network.

The default sector number is 0 and in the present embodiment the sector number currently should be 0 to begin training a subnet. After training is complete, the sub-net may be relocated or remapped into a different location of the PA provided that an adequate number of sectors are available. Those of ordinary skill in the art will recognize of course that it is possible to provide microcode which would allow training to begin at any sector of the PA and thus training need not necessarily begin at Sector 0 of the PA.

The ARR is not accessed directly by the host. The host can specify the sector number as a parameter during training or classification for use by the microcontroller. The microcontroller via its microcode sets the ARR according to the sector numbers received as a parameter provided by the host upon entering the training or classification mode of the neural network.

On chip microcode training involves a two step process. First, each new sub-net must be trained such that the number of prototypes required is known. After a sub-net is trained the microcode examines the available areas in the array and determines if that sub-net may be appropriately repositioned in another area of the PA. If a new position in the PA is available and this position would increase the processing efficiency of the neural network then the microcode remaps the sub-net into a different location in the PA. This relieves the system of knowing the configuration of any device. This is a valuable consideration since the external controller 238 (FIG. 9) need not keep track of extra information. Mapping of the network however, may be somewhat complicated by the fact that a neural network may have several bad blocks and thus the precise mapping of a sub-net may be difficult to repeat.

If multiple sub-nets exist in the neural network, switching between sub-nets involves loading the PPRAM 214 (FIG. 9)

with the data for that particular sub-net and restoring other parameters associated with that particular sub-net. For example, the number of features, the column number of the column after the last used prototype and the learning parading should be restored. Such a restoration must be performed after the neural network is powered up or reset even when the neural network includes only a single sub-net. It should be noted however that the PA 210 is a nonvolatile memory and thus the features stored in the PA do not have to be reloaded.

If there is enough space in the PA 210, all of the volatile information for the neural network including all of the sub-net information can be backed up in the PA. A restore command can then be used to activate a particular one of the sub-nets in which case all of the volatile parameters of the sub-net including the sector number should be reloaded in the PPRAM. The restore command can be issued by the host or executed by a series of commands in the microcode.

When the series of microcode commands are executed internally to restore information, a prototype array (PA) configuration table is required for operation of the restore command. The PA Configuration Table has stored therein information concerning each of the sub-nets present in the neural network. Generally, the host is responsible for updating and maintaining the information in the PA Configuration Table. However, in this particular example where restore is accomplished via microcode the neural network microcontroller updates the PA Configuration Table.

The PA Configuration Table occupies one block in the PA and the PA Configuration Table is stored in the last usable block of the PA prior to the block containing the bad column table (BCT). As used herein the term "block" generally refers to a pair of columns in the PA. A first one of the columns is referred to as a high column and a second one of the columns is referred to as a low column. The pair of columns are linked together via the PADCU circuitry and in the present embodiment have column indices separated by a value of 512. Thus, column 0 and column 512 form one block.

Upon initialization, the microcode sets the PA usage in each PPRAM entry according to the information in the PA Configuration Table. The RESTORE Command uses the PA Configuration Table to locate the backed up parameters for a particular sub-net. The PA Configuration Table includes a high column and a low column.

The high column of the PA Configuration Table may be provided as column 1022 for example and includes the information shown in TABLE 1.

TABLE 1

| Row | High Column of PA Configuration Table |
|---|---|
| 0 | 18Fh - Defined bit patterns to identify this column |
| 1 | 190h - defined bit pattern to identify this column |
| 2 | Number of sub-nets in the PA. |
| 3–7 | reserved |
| 8–15 | Sector Taken Bit Map. |
| 16–31 | reserved |
| 32–63 | Backup Block List |
| 64–127 | Row Usage Table |
| 128–255 | Network Identification Table. |

As can be seen in TABLE 1, rows 0 and 1 of the High Column of the PA Configuration Table hold defined bit patterns to identify columns 0 and 1 respectively. Row 2 of the High Column of the PA Configuration Table indicates the number of sub-nets which are stored in the PA. In the present embodiment there may be up to 64 sub-nets stored in the PA.

Rows 3–7 of the High Column of the PA Configuration are reserved and are not presently used. Rows 8–15 of the High Column correspond to a Boolean Sector Taken Bit Map which in the present embodiment is provided as a 64 bit map. The Sector Taken Bit Map will be described more fully below in conjunction with FIG. 11.

Rows 16–31 of the High Column of the PA Configuration Table are currently reserved and rows 32–63 hold a Backup Block List. The Backup Block List is a list of all blocks (except for a Bad Column Table block and the PA Configuration Table blocks) used for storage of data in ten-bit mode. Each entry in the list occupies two rows specifying a range of blocks. The end of this list is marked by a 0,0 entry. The first row of the Backup Block List holds the first block number (the number of the low column). The second row of the Backup Block List holds the number of consecutive backup blocks. It should be noted that bad blocks are not counted in this number.

Rows 64–127 form a Row Usage Table. For each sector, the Row Usage Table has one row at row number 64 plus the sector number. The Row Usage Table holds the number of rows used by data prototypes). This number includes data backed up in a mode using a method to be described herein below. It should be noted that any rows used within a sector must start with the first row and have no gaps.

Finally, rows 128–255 of the High Column of the PA Configuration Table correspond to a Network Identification Table. For each sector, the Network Identification Table holds two rows of information starting at row number 128 plus two times the starting sector number. The first row of the Network Identification Table holds a ten-bit network identifier (ID) assigned by the host. If the first row has a value of 0 then that indicates that no sub-net starts at this row. The second row of the Network Identification Table holds a ten-bit CRC generated by the host.

If the High Column of the PA Configuration Table corresponds to column 1022 of the PA then the Low Column of the PA Configuration Table would correspond to column 510 of the PA. The low column of the PA Configuration Table includes a Network Information Table. For each sector, the Network Information Table has four rows of information starting at row number 4 times the starting sector number. The information in any particular row is without meaning unless the Network Identification Table in the High Column of the PA Configuration Table indicates that there is a network associated with that particular sector number. The low column of the PA Configuration Table includes the information shown in TABLE 2:

TABLE 2

| Row | Low Column of PA Configuration Table | |
|---|---|---|
| 1 | bit 9: | Backed up in PA? (0=No, 1=Yes) |
| | bit 8: | BACKUP method. (0=method 1, 1=method 2) |
| | bits 7–0: | Row number where backup data begins. |
| 2 | Column number where backup data begins. | |
| 3 | Number of Features in Network (Does not include features used for method 1 backup data) | |
| 4 | Number of prototypes in the network | |

Thus, when multiple sub-nets are stored in the neural network 200 (FIG. 9), a portion of the PA 210 (FIG. 9) is allocated such that nonvolatile information concerning each of the sub-nets $SUBNET_0-SUBNET_N$ contained in the PA 210 may be stored therein. As described above, in the present embodiment the PA Configuration Table is allocated for such storage. The PA Configuration Table is provided as one block (i.e. two columns) of the PA 210 and the PA Configuration Table resides in the last usable block of the PA prior to a block containing a Bad Column Table (BCT). For example, if the Bad Column Table is stored in PA block 511 (column 1023 of the PA), then the PA Configuration Table will be stored in block 510 (columns 510 and 1022) of the PA.

The BCT on each neural network 200 contains information specific to that particular integrated circuit. The BCT contains bad column information generated during wafer sort and package sort operations. In this particular embodiment, the BCT is stored in the last usable column of the PA which typically corresponds to column 1023 of the PA. The low column of the BCT block (e.g. column 511 of the PA) is not available for storage of prototypes, however, the host may store a back-up copy of the BCT in this otherwise unused column.

Upon initialization of the integrated circuit 200, the microcode reads the BCT and marks any bad columns as DISABLED in the PPRAM. If one column is bad, then the other column is also considered bad and is thus rendered unusable. It should thus be noted that the BCT includes data for bad blocks and not simply bad columns and therefore problems which may arise due to repetitive programming and erasing may be avoided.

The row by row format of the Bad Column Table is as shown in TABLE 3.

TABLE 3

| Row Number | Information |
| --- | --- |
| 0 | 270h -- Defined bit pattern to identify this column. |
| 1 | 18 Fh -- Defined bit pattern to identify this column. |
| 2-4 | Serial Number |
| 5-6 | Sorted Date |
| 7 | Reserved |
| 8 | Number of bad blocks |
| 9-15 | Reserved |
| 16-143 | Bad Block Map |
| 144 | 190h -- Defined bit pattern to identify this column. |
| 145 | 26Fh -- Defined bit pattern to identify this column. |
| 146-255 | Bad Column List (two entries for each bad block |

As can be seen in Table 3, rows 0, 1, 144 and 145 contain defined patterns that are not likely to occur by accident and thus these rows serve to identify the Bad Column Table.

The BCT also includes a Bad Block Map. In the Bad Block Map of the BCT, each block is represented by two bits, and one PA row stores the data for four blocks. In the present embodiment the Bad Block Map occupies rows 16-143 of the Bad Column Table. The Bad Block Map thus occupies 128 rows to thus represent all 512 blocks of the PA. The format of the Bad Block Map is shown below in TABLE 4.

TABLE 4

| Bit Number | Information |
| --- | --- |
| 0-7 | Data for four blocks (for example: 0 through 3 in the low order bits)<br>10 Bad block<br>01 Good block<br>00,11 Only occurs if BCT is corrupted |
| 8-9 | Number of bad blocks in this group of four 00(0), 01(1), 1-(2), 11(3 or 4) |

Referring now to FIG. 11, a diagrammatical representation of the portion of the PA Configuration Table corresponding to the sector used map 280 is shown. The sector used map 280 is provided from eight rows of the PA Configuration Table with each of the eight rows having ten bits. Each bit of the sector used map 280 corresponds to a sector of the PA 210' (FIG. 10) and indicates whether that particular sector is being used. Thus, for example, corresponding bits of the sector used map would be set to indicate use of each of the sectors for $SUBNET_0$, $SUBNET_3$, $SUBNET_5$ and $SUBNET_{28}$ of FIG. 9A.

A sector is considered used or taken if the first column in the sector is used. The information contained in the sector used map may be used, for example, to indicate that a particular sector is not available for training.

If the PA were divided into 128 sectors rather than 64 sectors then the Sector Used Map would have 128 bits each of which would correspond to a particular sector of the 128 sector PA.

Figure 12:
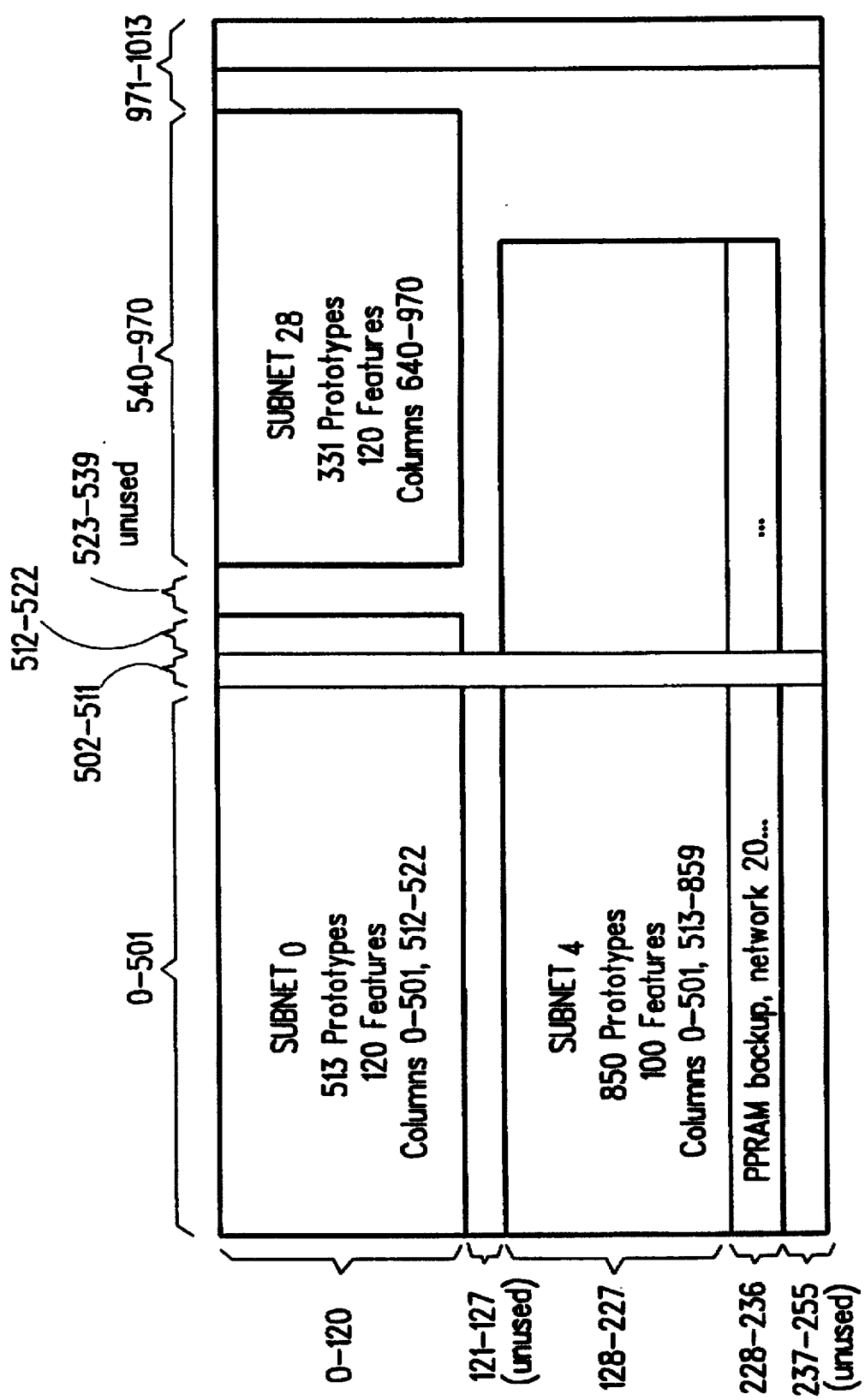
FIG. 12 is a block diagram of a prototype memory array having three sub-nets stored thereon.

Referring now to FIG. 12, an example of a multi-network neural network integrated circuit having three sub-nets, $SUBNET_0$, $SUBNET_{04}$, and $SUBNET_{28}$ stored therein is shown. In this example, each of the sub-nets $SUBNET_0$, $SUBNET_4$, $SUBNET_{28}$ are backed up in the PA. There exist two methods to back up the sub-nets. Each of these methods will be described in detail further below. Suffice it here to say that $SUBNET_0$ and $SUBNET_{28}$ are backed up using method 1, and $SUBNET_4$ is backed up using method 2.

It is also assumed in the present example that the PA has no bad columns and thus the Bad Column Table occupies columns 511 and 1023 of the PA. Although columns 511 and 1023 of the PA each contain Bad Column Table data therein, the data in column 511 is generally only used as a backup if needed.

Since in this example the BCT occupies columns 511 and 1023 of the PA, the PA Configuration Table occupies columns 510 and 1022 of the PA. Column 510 holds the low part of the PA Configuration Table and column 1022 holds the high part of the PA Configuration Table.

Columns 502-509 and 1014-1021 of the PA are allocated for storage of backup data for $SUBNET_0$ and $SUBNET_{28}$. The host allocates columns 502-509 in 1014-1021 as ten-bit columns. Thus during training these columns would be passed over and the sub-net would move into the upper half of the PA. In the present design to avoid unnecessarily complicating the microcode, each column in the same block must contain data of the same type. That is, each block for example must hold either five-bit data (e.g. a prototype) or ten-bit data but cannot hold both five-bit and ten-bit data. Thus, a block corresponds to a pair of columns separated by 512-which contains data will always contain either five-bit or ten-bit data and will not contain both five-bit and ten-bit data.

Those of ordinary skill in the art will recognize of course that it is possible to provide microcode which could manipulate blocks containing both five-bit and ten-bit data.

Columns 971-1013 are unused in this example. $SUBNET_4$ has its PPRAM information backed up in five-bit mode in rows 228-236 of the PA.

The host system can fill up the BACKUP columns in any order, however, as an illustration, the PA Configuration Table information and the BACKUP information might appear as shown in TABLES 5 and 6 below.

TABLE 5

PA Configuration Table

| Column 510: | | Column 1022: | |
|---|---|---|---|
| 0: | 200 (hexadecimal) | 0: | some defined bit pattern |
| 1: | 502 | 1: | some defined bit pattern |
| 2: | 119 | 2 | 3 |
| 3: | 522 | 3-7 | xx11111111 |
| | | 8 | xx11111111 |
| | | 9 | xx11111111 |
| | | 10 | xx11111110 |
| | | 11 | xx11111110 |
| | | 12 | xx11111110 |
| 14: | 23C (hexadecimal) | 13 | xx11111110 |
| 15: | 1018 | 14 | xx11111110 |
| 16: | 119 | 15 | xx11111110 |
| 17: | 970 | 16-31: | reserved |
| . | | 32-63 | Backup Block List |
| . | | | |
| . | | | |
| 80: | 33C hex | 64-127 | Row Usage Table |
| 81: | 1021 | | CRC for network 05 |
| 82: | 227 | 128-255 | Network ID for SUBNET$_0$, SUBNET$_4$, SUBNET$_{2a}$ |
| 83: | 859 | | |

In TABLE 6 below the row numbers are given in decimal base.

TABLE 6

Back Up Information

| Row No. | Column 502 Contents | Row No. | Column 1014 Contents |
|---|---|---|---|
| 0-148 | Network information for SUBNET$_0$ | 0-251 | PPRAM data, prototypes 52-107 |
| 19-252 | PPRAM data, prototypes 108-163 | 255 | 503 |
| 255 | 1014 | | |

| Row No. | Column 503 Contents | Row No. | Column 1015 Contents |
|---|---|---|---|
| 0-251 | PPRAM data, prototypes 108-163 | 0-251 | PPRAM data, prototypes 164-219 |
| 255 | 1015 | 255 | 504 |

| Row No. | Column 504 Contents | Row No. | Column 1016 Contents |
|---|---|---|---|
| 0-251 | PPRAM data | 0-251 | PPRAM data, prototypes 276-331 |
| 255: | 1016 | 255 | 505 |

| Row No. | Column 505 Contents | Row No. | Column 1017 Contents |
|---|---|---|---|
| 0-251 | PPRAM data prototypes 332-387 | 0-251 | PPRAM data, prototypes 388-443 |
| 255 | 1017 | 255 | 506 |

| Row No. | Column 506 Contents | Row No. | Column 1018 Contents |
|---|---|---|---|
| 0-251 | PPRAM data, prototypes 444-499 | 0-58 | PPRAM data, prototypes 500-501, 512-522 |
| 255: | 1018 | 59-77 | Network information for SUBNET$_{2a}$ |
| | | 78-253 | PPRAM data, prototypes 640-678 |
| | | 255 | 507 |

TABLE 6-continued

Back Up Information

| Row No. | Column 507 Contents | Row No. | Column 1019 Contents |
|---|---|---|---|
| 0-251 | PPRAM data, prototypes 679-734 | 0-251 | PPRAM data, prototypes 735-790 |
| 255 | 1019 | 255 | 508 |

| Row No. | Column 508 Contents | Row No. | Column 1020 Contents |
|---|---|---|---|
| 0-251 | PPRAM data, prototypes 791-846 | 0-251 | PPRAM data, prototypes 847-902 |
| 255 | 1020 | 255 | 509 |

| Row No. | Column 509 Contents | Row No. | Column 1021 Contents |
|---|---|---|---|
| 0-251 | PPRAM data, prototypes 903-958 | 0-53 | PPRAM data, prototypes 959-970 |
| 255 | 1021 | 54-72 | Network information for SUBNET$_4$ |

Backed up Networks

The host system may specify that back-up is to be done to either an external file or alternatively back-up is to be done on the integrated circuit. If it is desirable to back-up the sub-nets on the integrated circuit and if there is enough memory in the PA, volatile information associated with each of the sub-nets SUBNET$_0$–SUBNET$_N$ stored in the PA 210 can be backed up in unused areas of the PA 210. PA columns are dedicated to BACKUP storage one block (2 columns) at a time.

As mentioned above, in present embodiment, it is not possible to use one column of a block to store five-bit data (e.g. weights) and use the other column of the same block to store ten-bit data (e.g. BACKUP information). If more that one column is used for BACKUP data for any one network, the last row of each BACKUP column (excluding the last) will point to the next column where the data is continued.

As shown in Table 7 below, for each network that is backed up in the PA 210, the backup information begins with 16 rows of data describing the network as a whole. The host can obtain the backup information for the active network by reading the PA Configuration Table. When stored in PA, the information starts as the row and column indicated in the PA Configuration Table.

TABLE 7

| Row Number | |
|---|---|
| 1 | Learning paradigm (10 bits) |
| 2 | Maximum Radius [12:10] Minimum Radius [12:10] Smoothing Factor Exponent Offset (4 bits) |
| 3 | Maximum Radius [9:0] |
| 4 | Minimum Radius [9:0] |
| 5 | Parameter A[15:8] l00 |
| 6 | 00 l Parameter A[7:0] |
| 7 | Parameter B[15:8] l00 |
| 8 | 00 l Parameter B[7:0] |
| 9 | Parameter C[15:8] l00 |
| 10 | 00 l Parameter C[7:0] |
| 11 | Parameter D [15:8] l00 |
| 12 | 00 l Parameter D[7:0] |
| 13 | Parameter E [15:8] l00 |
| 14 | 00 l Parameter E[7:0] |
| 15 | Parameter F[15:8] l00 |
| 16 | 00 l Parameter F[7:0] |

PPRAM Format

In addition to each network being backed up in the PA 210, the contents of the PPRAMentries for the prototypes in the network are backed up in the PA 210. In PPRAM, the data has the format shown in TABLE 8.

TABLE 8

| | |
|---|---|
| PPRAM3 [15:0]: | Count (unsigned 16 bits) |
| PPRAM2 [15:14]: | PA Usage field |
| | 00: unused column |
| | 01: column contains data in format |
| | 10: column reserved for 10-bit format data |
| | 11: reserved encoding |
| PPRAM2 [13]: | Disable bit, set to 1 for bad (unusable) columns |
| PPRAM2 [12:0]: | Threshold Radius (13 bits) |
| PPRAM2 [15:8]: | Smoothing Factor (8 bits) |
| PPRAM1 [7]: | Used bit |
| PPRAM1 [6]: | Probabilistic bit |
| PPRAM1 [5:0]: | Class number (6 bits) |

When PPRAM data is backed up in PA, only 45 bits of each entry are saved. The PA Usage field and the Disable bit are not saved, since the information they contain can be inferred from the fact that the entry is backed up. It should be noted that it is not necessary to save the Used bit, since it is redundant.

The PPRAM data may be backed up in the PA using one of two methods. The method used is indicated in row 1 bit 8 of the low column of the PA Configuration Table.

In the first PARAMdata back-up method, referred to as method one, each PPRAM entry is stored in ten-bit mode in 4.5 rows (45 bits) of a single PA column. The PPRAM entries are saved in consecutive order immediately following the 19 rows of network data. The PPRAM data for two prototypes occupies 9 rows of PA, as shown in TABLE 9.

TABLE 9

| Row Number | |
|---|---|
| 1 | prototype 1 PPRAM3 [9:0] |
| 2 | prototype 1 PPRAM3 [10], PPRAM2 [12:4] |
| 3 | prototype 1 PPRAM1 [15:10], PPRAM2 [3:0] |
| 4 | prototype 1 PPRAM1 [9:0] |
| 5 | prototype 1 PPRAM3 [15:11], prototype 2 PPRAM3 [15:11] |
| 6 | prototype 2 PPRAM3 [9:0] |
| 7 | prototype 2 PPRAM3 [10], PPRAM2 [12:4] |
| 8 | prototype 2 PPRAM1 [15:10], PPRAM2 [3:0] |
| 9 | prototype 2 PPRAM1 [9:0] |

Pairs of PPRAM entries are saved in the format shown in TABLE 9 until the backup column has less than 10 empty rows left. Then the column number of the next column, where the PPRAM data will be continued starting in row 0, gets written into row 255. It is acceptable to allow a few rows to be left unused between the last PPRAM pair in a backup column and the pointer to the next backup column, as long as it is less than 9 unused rows.

A pair of PPRAM entries should not straddle a column boundary, even if there are more than 4 but less than 9 rows available at the end of a column. There should never be a single backed up PPRAM entry by itself, unless the network has an odd number of prototypes and this is the last one.

Thus, it should be noted that the last weight in any BACKUP column points to the next column where the data is continued, if there is more data for the same network. The limitation of not allowing the PPRAM data for any one prototype to straddle a column boundary is made to simplify operation of the microcode. Thus, for example, if space exists for only one more entry at the bottom of a column (e.g. more than four rows but less than nine rows), one entry should be stored in 4.5 rows, and the next entry should start a new pair at the first row of the column where the PPRAM data is continued. In FIG. 12, $SUBNET_0$ and $SUBNET_{28}$ are backed up using method one.

In the second PPRAM data back-up method, referred to as method two, each PPRAM entry is stored in five-bit mode in nine rows (45 bits) of its own PA column, immediately following the last programmed weight for this sub-net. The following format shown in TABLE 10 for example, may be used:

TABLE 10

| Row Number | |
|---|---|
| 1 | PPRAM3 [15:11] |
| 2 | PPRAM3 [10:6] |
| 3 | PPRAM3 [5:1] |
| 4 | PPRAM2 [12:9], PPRAM 3 [0] |
| 5 | PPRAM2 [8:4] |
| 6 | PPRAM1 [15] PPRAM2 [3:0] |
| 7 | PPRAM1 [14:0] |
| 8 | PPRAM1 [9:5] |
| 9 | PPRAM1 [4:0] |

Method 2 may be preferred, for example, in those instances when there are some unused weights after the last row of a network, and especially in those instances where 9 additional rows may be filled without crossing sector boundaries. In this event, columns would be saved since only the 16 rows of Back Up network information have to be stored for this network in a dedicated BACKUP column. In FIG. 12 $SUBNET_4$ has been backed up using method two.

Outputs from training one sub-net may be used as inputs to train a second sub-net. For example, the outputs from $SUBNET_0$ may be fed into the input of $SUBNET_{28}$ and similarly the output from $SUBNET_{28}$ may be fed into the input of $SUBNET_5$ (FIG. 9A).

In the classification mode, if the data for $SUBNET_0$ and $SUBNET_4$ originate from two different sources, i.e. two different pieces of data, then the external controller 238 manages the presentation of external data to the neural network 200. That is, the external controller 238 properly separates the data provided to $SUBNET_0$ and to $SUBNET_4$.

However, if the data is provided from one source, the data may be presented to the multiple sub-nets $SUBNET_0$–$SUBNET_N$ simultaneously. That is, the external controller 238 may copy the data and simultaneously input the data as input vectors to more than one sub-net.

Furthermore, the neural network may operate in multiple stages. For example, sub-nets $SUBNET_0$ and $SUBNET_3$ may act as a feature extraction network. The outputs from sub-nets $SUBNET_0$ and $SUBNET_3$ may then be fed to sub-network $SUBNET_{28}$ which acts as a features segmenter. The output from feature segmenter $SUBNET_{28}$ may be subsequently fed to the sub-network $SUBNET_5$ which acts as a segment block classifier.

The microcode utilizes a scratch register referred to as a GRAM. The host has access to the GRAM via a predetermined set of commands. During initialization, the GRAM holds information to set up a PPRAM offset value for each sub-net to be stored in the neural network.

In the present embodiment, the GRAM is provided from a block of 256 memory locations which, in the present embodiment, is mapped at hexadecimal addresses 1000 through 10FF on the neural network. The GRAM is maintained by the microcontroller, but can also be accessed by the host. Constants and variables used by microcontroller software are loaded from instruction memory (PGFLASH) into the GRAM.

Several locations in GRAM are of particular interest to the host, because they hold certain parameters that describe sub-nets on the neural network integrated circuit. Sometimes the host must write to some of these locations, using a RAMWRITE command. For example the host writes to the GRAM when performing certain high level functions, such as loading sub-nets into the neural network integrated circuit. It is not necessary, however, for the host to write to these locations for normal learning, or for restoring subnets with the RESTORE command.

When the host loads a sub-net (PA and/or PPRAM) into the neural network integrated circuit a NEXT_PT parameter located at address 105Ch of the GRAM is set equal to the number of prototypes, plus the number of disabled columns and columns reserved for 10-bit data that are encountered and skipped over in the process of loading the sub-net into the PA and/or PPRAM.

A parameter PT_DIM located at address 105Dh of the GRAM corresponds to the number of features in the sub-net. When the host loads a sub-net (PA and/or PPRAM) into the neural network integrated circuit, this parameter must be set equal to the number of features.

A parameter LearnParadigm located at address 105Eh of the GRAM holds the paradigm used in training the sub-net on the neural network integrated circuit. When the host loads a sub-net, the host should set the Learn Paradigm parameter to a value that designates that particular sub-net's paradigm. For example, a value of 0 may indicate no sub-net is present, a value of 1 may indicate an RCE/PRCE paradigm was used and a value of 2 for may indicate a PNN paradigm was used.

A parameter identified as SectorNumber located at address 1062h of the GRAM has six bits. Bits 5-3 represent the starting PA column number divided by the total number of PA columns per sector which in the present embodiment corresponds to 128 and bits 2-0 represent the starting PA row number divided by the total number of rows per sector which in the present embodiment corresponds to 32. The host writes to the Sector Number location when loading a subnet or switching to any specific sub-net in the neural network integrated circuit without using the RESTORE command.

A parameter identified as SmoothingBias located at address 1063h of the GRAM holds the value of the smoothing factor exponent offset. It should be noted that this value is part of the smoothing factor and thus changing this value changes the sub-net with which it is associated.

Parameters identified as Param_A through Param_F are located at addresses 1064h-1069h. Those are currently not defined, but are reserved for any additional parameters that may be needed if learning and/or classification paradigms other than RCE, PRCE, and PNN are implemented on the neural network integrated circuit in the future.

A parameter DIAG_MASK located at address 106Ah of the GRAM should normally set to a default value of 0. Only one bit of the DIAG_MASK parameter is currently defined. Bit 0, when set, enables the host to write any value into all bits of a PPRAM entry, including the PA Usage field and the Used and Disable bits, even if the data is inconsistent or does not make sense. This is provided for debugging capability, and should generally not be set for normal usage.

In the neural network integrated circuit microcontroller software, bits 15-14 of PPRAM2 are defined as the PA Usage field. they do not affect the hardware. This field indicates whether the corresponding PA column contains any meaningful data:

00 This column is currently not used for anything

01 At least one row in this column has been programmed with data.

10 The host has reserved this column for data in 10-bit mode.

11 Reserved

PA Usage Field

It should be noted that the host is not permitted to alter the PA Usage field directly. The microcontroller software ignores the corresponding bits in the input data for PPRAMWRITE, and for RAMWRITE when the target address is in the PPRAM2 address range. The host can override this restriction by setting bit 0 of the diagnostic word in GRAM at address 106Ah. The microcontroller software maintains the PA Usage Field with the following guidelines.

First, the PA columns must be reserved for ten-bit data per block (2 columns) at a time and ten-bit and five-bit data are not permitted in the same block of PA.

The initialization microcode sets the PA Usage Field to ten-bit mode for both columns in the BCT and PA Configuration Table blocks, and for both columns in each block that is reserved for ten-bit data in the Backup Block List in the PA Configuration Table. The initialization microcode also sets the PA Usage field to five-bit mode for each column that contains prototype features for any sub-net. This information may also be derived from the PA Configuration Table. The Initialization microcode also sets the PA Usage fields for all other columns to unused (00).

A LEARNBEGIN command clears the PA Usage fields of all columns on the integrated circuit, except ten-bit (10) and disabled columns.

A LEARNVECTOR command sets the PA Usage field of the column indicated by NEXT_PT to five-bit (01). If the column in NEXT_PT is ten-bit (10) or disabled, it is skipped. Successive columns will continue to be skipped until one is found which is five-bit (01) or unused (00), up to the end of the PA. If no such column is found, a CHIP_FULL error is returned.

A five-bit COLUMNWRITE command sets the PA Usage field of the indicated column to five-bit (01), provided the column is currently marked unused (00) or five-bit (01). The other column in the block is not affected. The write is not performed and generates an error if the column is marked ten-bit (error BAD_BIT_MODE), or disabled (error DIS_COLUMN_ERROR).

A ten-bit COLUMNWRITE command sets the PA Usage fields of both columns in the block to ten-bit (10). The write is not performed and generates an error if either column in the block is five-bit (01) or disabled. Furthermore, the target column must be in an erased condition (i.e. all 0's) before issuing this command, otherwise NOT_ERASED is returned.

A BLOCKERASE command sets the PA Usage fields of both columns in the block to unused (00), regardless of current usage. An attempt to erase a disabled block generates an error (DIS_COLUMN_ERROR).

A COLUMNERASE command of a five-bit column sets its PA Usage field to unused (00), unless the column is disabled (an error is returned if so). The PA Usage field of the other column in the block is unaffected. A COLUM- NERASE command of a ten-bit column, however, does not affect the PA Usage field. Both columns in the block remain ten-bit. Thus, unlike five-bit COLUMNERASE, all bits of the other column in the block are preserved.

Figure 13:
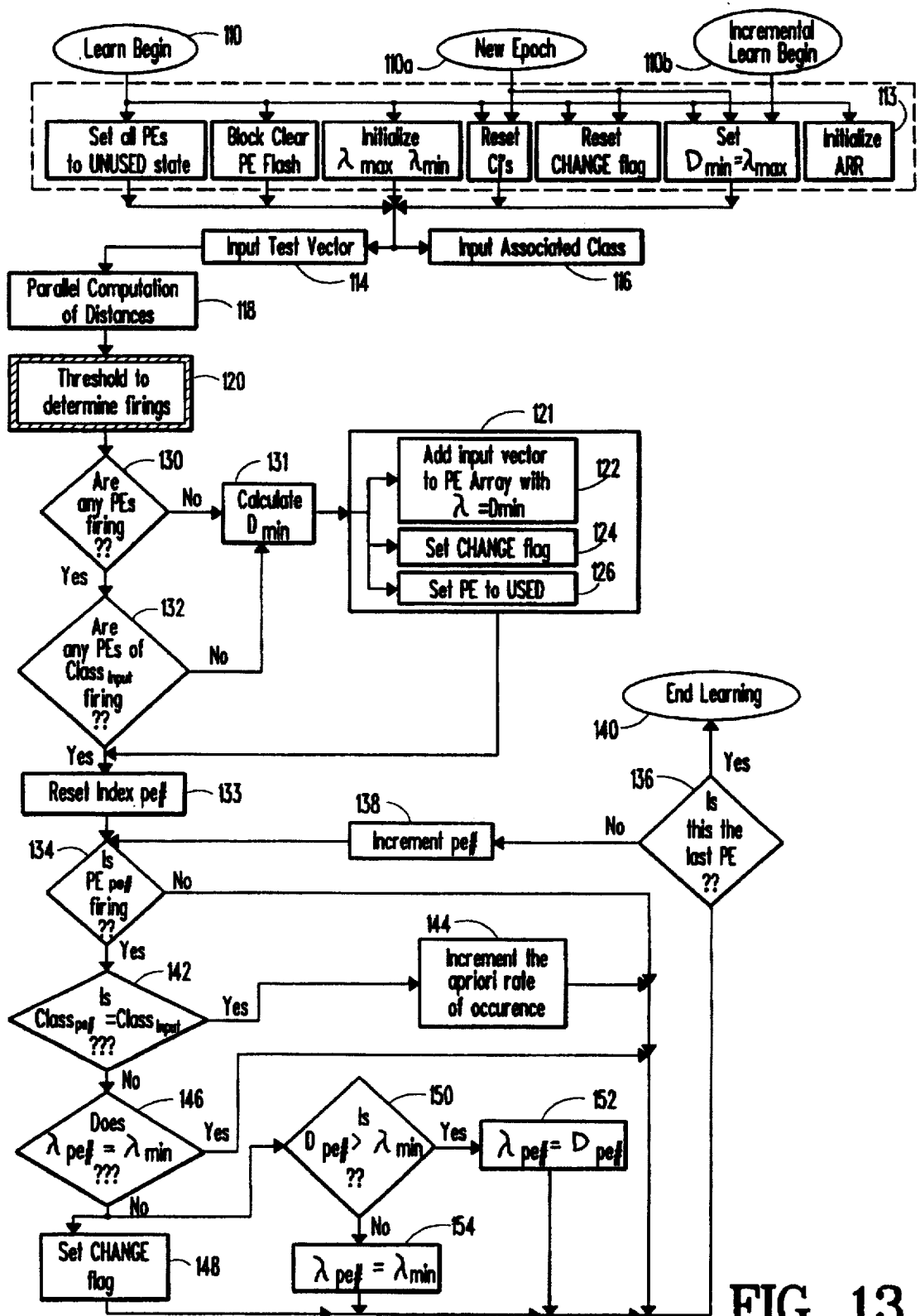
FIG. 13 is a flow diagram of the training steps used to train multiple sub-nets.

Referring now to FIG. 13, a flow diagram which illustrates the training steps in a multi-network neural network is shown. The steps in the flow diagram must be followed for each of the plurality of sub-nets $SUBNET_0$–$SUBNET_N$. Each of the steps is similar to the steps used in the training of a single network as described above in conjunction with FIG. 6. However, in initialization block 112 an additional operation to initialize the ARR is shown in step 113.

Parallel Training

Training of the multiple neural networks stored in the PA 210 can be accomplished in parallel with the following rules. First, if sub-nets have identical inputs (i.e. same number of input features) their training can proceed in parallel. When the subnets have identical inputs they are aligned to the same input data lines and use the same input vectors.

As shown in FIG. 9A $SUBNET_0$ and $SUBNET_{28}$ are provided having the same number of input vectors and thus can be trained in parallel. The number of features to be used in the training of $SUBNET_0$ and $SUBNET_{28}$ is known apiori and stored in the a register of the neural network 200. The ARR holds offset of the starting address of the column which encompasses both $SUBNET_0$ and $SUBNET_{28}$. Thus, in this particular example, the ARR aids in computing the starting address of column 970. Likewise, the ARR contains the offset of the starting address of the row at which $SUBNET_0$ begins which in this particular example, corresponds to row 0. Thus, in this case the ARR row bits are set to 0 and added to an offset which arrives at address of the PA at row 0.

The paradigms used for training $SUBNET_0$ and $SUBNET_{28}$ are identical. However, the number of classes in $SUBNET_0$ may be different than the number of classes in $SUBNET_{28}$. For example, $SUBNET_0$ may have ten classes while $SUBNET_{28}$ may have four classes. The $SUBNET_0$ and $SUBNET_{28}$ are trained on the same data but provide different results. Each sub-net $SUBNET_0$ and $SUBNET_{28}$ is trained substantially in the manner in accordance with the learning steps shown in the flow diagram of FIG. 13.

The microcontroller manages the individual networks without regard to the row or column address. That is, from the information in the PA Configuration Table the microcontroller monitors the number of prototypes being trained and thus has knowledge of when each sub-net is fully trained. For example, the microcontroller has information which allows it to determine when each of the prototypes between columns 970 and 640 have been trained.

However, when the microcontroller determines that column 640 has been reached and thus $SUBNET_{28}$ is trained, rather than introducing new data to the neural network 200 the microcontroller continues the training by skipping unused columns 523–539 and continues the training in column 522 to thus train $SUBNET_0$. The same data will be presented to $SUBNE_0$ however, $SUBNET_0$ will be trained using the different classes.

Considering a particular example, assume that $SUBNET_0$ has ten classes corresponding to the numbers 0–9. Similarly, assume that $SUBNET_{28}$ has four classes corresponding to TEXT, GRAPHIC, MIXED and NOISE where mixed indicates a combination of text and graphics. When features are first presented to the neural network the microcontroller begins training $SUBNET_{28}$. Thus the prototypes are trained to distinguish the four classes text, graphic, mixed and noise.

The training proceeds in a manner substantially similar to that shown in FIG. 13. When the training of the prototypes in columns 970–640 is complete training on the same data begins in column 522 to thus begin training of $SUBNET_0$. Thus the same features are presented to $SUBNET_0$ and prototypes in $SUBNET_0$ are established.

During the training of $SUBNET_0$ none of the classes associated with $SUBNET_{28}$ are affected. After training of $SUBNET_0$ and $SUBNET_{28}$ are complete, when data is presented to the neural network a response is elicited from both $SUBNET_0$ and $SUBNET_{28}$. $SUBNET_0$ would indicate one of the ten classes 0–9 while $SUBNET_{28}$ would indicate one of the four classes text, graphic, mixed or noise.

For example, when the number 3 is presented to the neural network $SUBNET_0$ should provide an output of class 3 and $SUBNET_{28}$ should provide an output of TEXT. If $SUBNET_0$ provided an output of class 3 and $SUBNET_{28}$ provided an output of class MIXED then this would provide an indication that an error may possibly have been occurred and the confidence value assigned to this classification would accordingly reflect this fact.

During training, the microcontroller executes the steps which control and manage the simultaneous training. Thus the microcontroller needs the information which indicates the number of columns in each sub-net and the number of sub-nets in the neural network. All of this information may be provided to the microcontroller through the PA Configuration Table.

The parallel training method is not restricted or specific to RCE or PRCE techniques. Rather the parallel training method can be used for any neural network design including back propagation, charge clustering (CCN) linear vector quantization (LVQ) or at least means squares (LMS). Thus the architecture of the present invention is versatile.

The operation of the neural network 200 (FIG. 9) may be enhanced by allowing non-sequential dedication of memory 210. That is, it is possible to use one portion of $SUBNET_0$ in the computations of $SUBNET_{28}$ for example. This is advantageous since one sub-net may often contain information useful to other sub-nets. Thus the ability to utilize other portions of memory (i.e. borrow from previous knowledge in another neural network) is useful.

If multiple sub-nets are arranged in the PA such that they can be trained in parallel, then the computer data associated with each sub-net is computed in parallel. In FIG. 9A, for example, parallel computations of distance may be done for $SUBNET_0$ and $SUBNET_{28}$. After the parallel computations are complete, the $SUBNET_0$ results are processed and then the $SUBNET_{28}$ results are processed. Thus, in this instance the learning time has been divided in half.

Pre-defined network learning control parameters generally referred to as data tags are used to inform the neural network 200 which of the plurality of sub-nets $SUBNET_0$–$SUBNET_N$ are being trained. Thus in FIG. 12 the data tags would indicate to the microcontroller that $SUBNET_0$ and $SUBNET_{28}$ are being trained in parallel and thus can also perform simultaneous classification.

What is claimed is:

1. A neural network for processing an input pattern in an effort to classify said input pattern into one or more classes, said neural network comprising:

a memory array;

a controller operative to store a plurality of sub-nets in said memory array, each of said sub-nets comprising a corresponding plurality of weights;

a distance calculation unit coupled to said memory array for calculating a distance between at least one feature of said input pattern and said plurality of weights of one of said plurality of sub-nets;

a math unit coupled to said distance calculation unit for comparing said calculated distance with a region of influence value associated with each of said plurality of weights of said one of said plurality of sub-nets to provide a class response output signal, wherein said input pattern is classified into said one or more classes using said one of said plurality of sub-nets independently of other ones of said plurality of sub-nets; and a prototype parameter memory for storing said region of influence value associated with each of said plurality of weights of said one of said plurality of sub-nets.

2. The neural network recited in claim 1 wherein said class response output signal is indicative of which, if any, of said one or more classes is firing.

3. The neural network recited in claim 1 wherein said class response output signal is indicative of a probability that said input pattern is associated with said one or more classes as computed by a probability density function.

4. The neural network recited in claim 1 wherein said class response output signal provides an input pattern for classification by another one of said plurality of sub-nets.

5. The neural network recited in claim 1 wherein said prototype parameter memory additionally stores a class type indicator.

6. The neural network recited in claim 1 wherein said prototype parameter memory additionally stores a smoothing factor.

7. The neural network recited in claim 1 wherein said distance calculation unit comprises a plurality of computation units, each one associated with at least one of said plurality of sub-nets, for simultaneously computing a distance between at least one feature of said input pattern and said plurality of weights of said at least one associated sub-net.

8. The neural network recited in claim 1 wherein said neural network is formed on an integrated circuit.

9. A neural network for processing an input pattern in an effort to classify said input pattern into one or more classes, said neural network comprising:

a prototype array distance calculation unit comprising:
   a memory array comprising a plurality of memory array regions; and
   a distance calculation unit comprising a plurality of computation units, each one associated with and coupled to at least one of said plurality of memory array regions;

a controller operative to store a plurality of sub-nets in said memory array, each sub-net comprising a corresponding plurality of weights and being stored in a respective one of said plurality of memory array regions;

a math unit responsive to at least one of said plurality of computation units for providing a class response output signal; and a prototype parameter memory coupled to said math unit for storing a region of influence value associated with each of said plurality of weights of one of said plurality of sub-nets, wherein said math unit compares said calculated distance provided by one of said plurality of computation units associated with said one of said plurality of sub-nets with said region of influence value associated with each of said plurality of weights of said one of said plurality of sub-nets in order to provide said class response output signal.

10. The neural network recited in claim 9 wherein each of said plurality of computation units computes a distance between at least one input feature of said input pattern and a plurality of weights of a sub-net stored in said associated memory array region and wherein said math unit is responsive to said distance computed by said at least one computation unit for providing said class response output signal.

11. The neural network recited in claim 10 wherein each of said plurality of computation units computes said distance substantially simultaneously.

12. The neural network recited in claim 9 wherein said prototype parameter memory additionally stores a class type indicator.

13. The neural network recited in claim 9 wherein said prototype parameter memory additionally stores a smoothing factor.

* * * * *

UNITED STATES PATENT AND TRADEMARK OFFICE
CERTIFICATE OF CORRECTION

PATENT NO. : 5,701,398
DATED : December 23, 1997
INVENTOR(S) : Michael T. Glier, et al.

It is certified that error appears in the above-identified patent and that said Letters Patent is hereby corrected as shown below:

Column 16, line 62, "In respprototype m initial learning step" should read --In response to the initial learning step--.

Column 18, line 46, "$\#_{min}.$" should read --$\lambda_{min}.$--.

Column 18, line 47, "$\#_{min},$" should read --$\lambda_{min},$--.

Column 33, line 58, "to $SUBNE_0$" should read --to $SUBNET_0$--.

Signed and Sealed this

Seventh Day of December, 1999

Attest:

Attesting Officer

Q. TODD DICKINSON

Acting Commissioner of Patents and Trademarks